United States Patent [19]
Minamoto et al.

[11] Patent Number: 6,122,089
[45] Date of Patent: Sep. 19, 2000

[54] OPTICAL DEFLECTOR COMPRISING A MOVABLE MEMBER HAVING A HIGH RIGIDITY AND A REDUCED MOMENT OF INERTIA AND A METHOD FOR PRODUCING THE SAME

[75] Inventors: Yukiaki Minamoto; Naohito Shiga, both of Hachioji; Kenji Sato, Shiojiri, all of Japan

[73] Assignee: Olympus Optical Co., Ltd., Tokyo, Japan

[21] Appl. No.: 09/206,545

[22] Filed: Dec. 7, 1998

[30] Foreign Application Priority Data

Dec. 9, 1997 [JP] Japan ................................. 9-338827
Nov. 4, 1998 [JP] Japan ................................ 10-313488

[51] Int. Cl.⁷ .................................................. G02B 26/08
[52] U.S. Cl. ........................... 359/198; 359/223; 359/224; 359/212; 359/213; 359/214
[58] Field of Search ..................... 359/198, 223, 359/224, 212, 213, 214

[56] References Cited

U.S. PATENT DOCUMENTS 5,606,447  2/1997  Asada ........................................ 359/199
5,912,608  6/1999  Asada ........................................ 359/198

FOREIGN PATENT DOCUMENTS 62-210418   9/1987  Japan .
62-210418A  9/1987  Japan .
1-195414    8/1989  Japan .

Primary Examiner—Cassandra Spyrou
Assistant Examiner—Leo Boutsikaris
Attorney, Agent, or Firm—Frishauf, Holtz, Goodman, Langer & Chick, P.C.

[57] ABSTRACT

An optical deflector has a supporter. A movable plate has a mirror face for reflecting light. At least one elastic member is provided for connecting the movable plate and the supporter and holding the movable plate so that the movable plate can deflect. A driving coil is formed in a ring form on the movable plate in such a manner that the driving coil passes near a movable end of the movable plate when the movable plate deflection-moves. A magnet and a magnetic yoke generate a closed magnetic circuit for applying a magnetic field to the driving coil in the direction substantially parallel to the plane of the movable plate. The magnet or the magnetic yoke generating the closed magnetic circuit is arranged at a position opposite to the movable end of the movable plate outside the driving coil, and at a position near the movable plate inside the driving coil to form a magnetic gap.

15 Claims, 12 Drawing Sheets

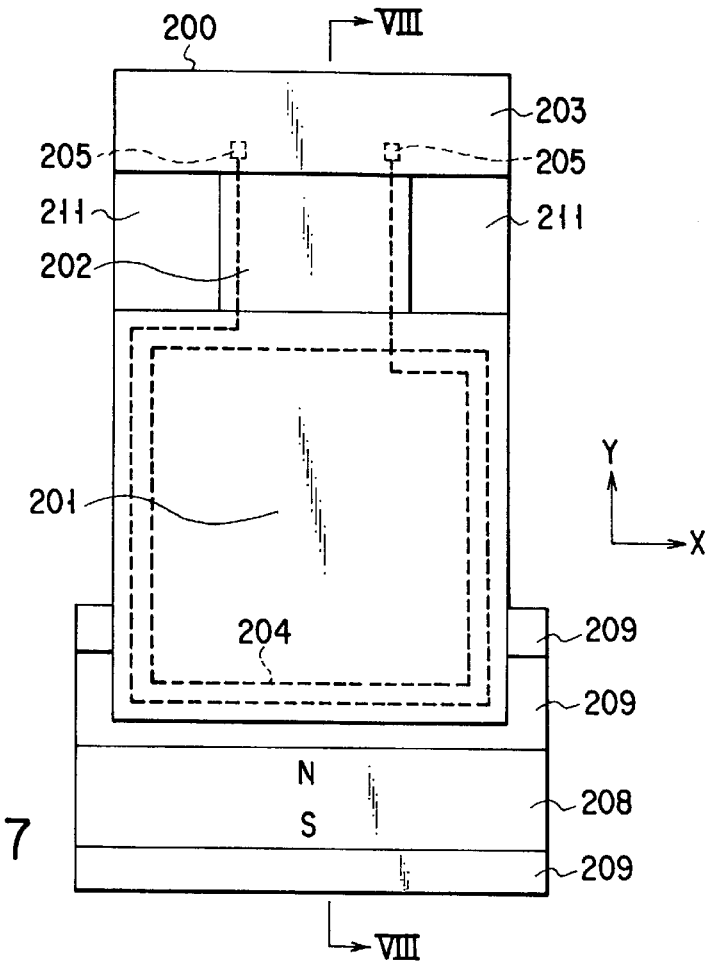
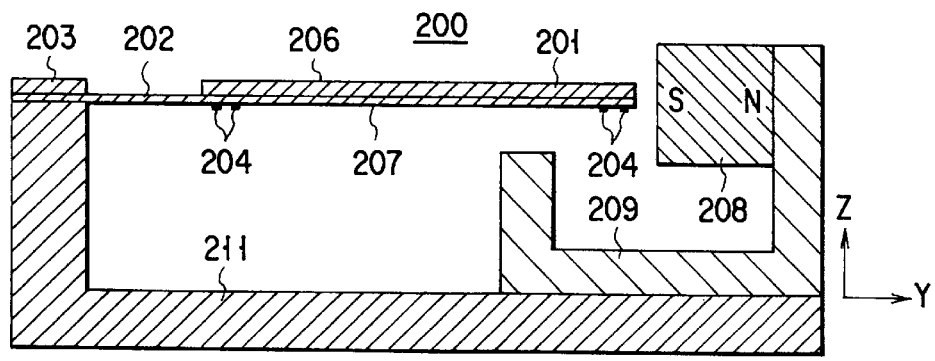
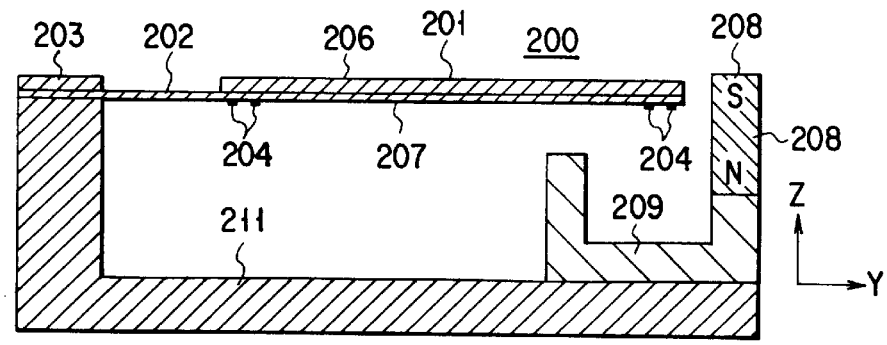

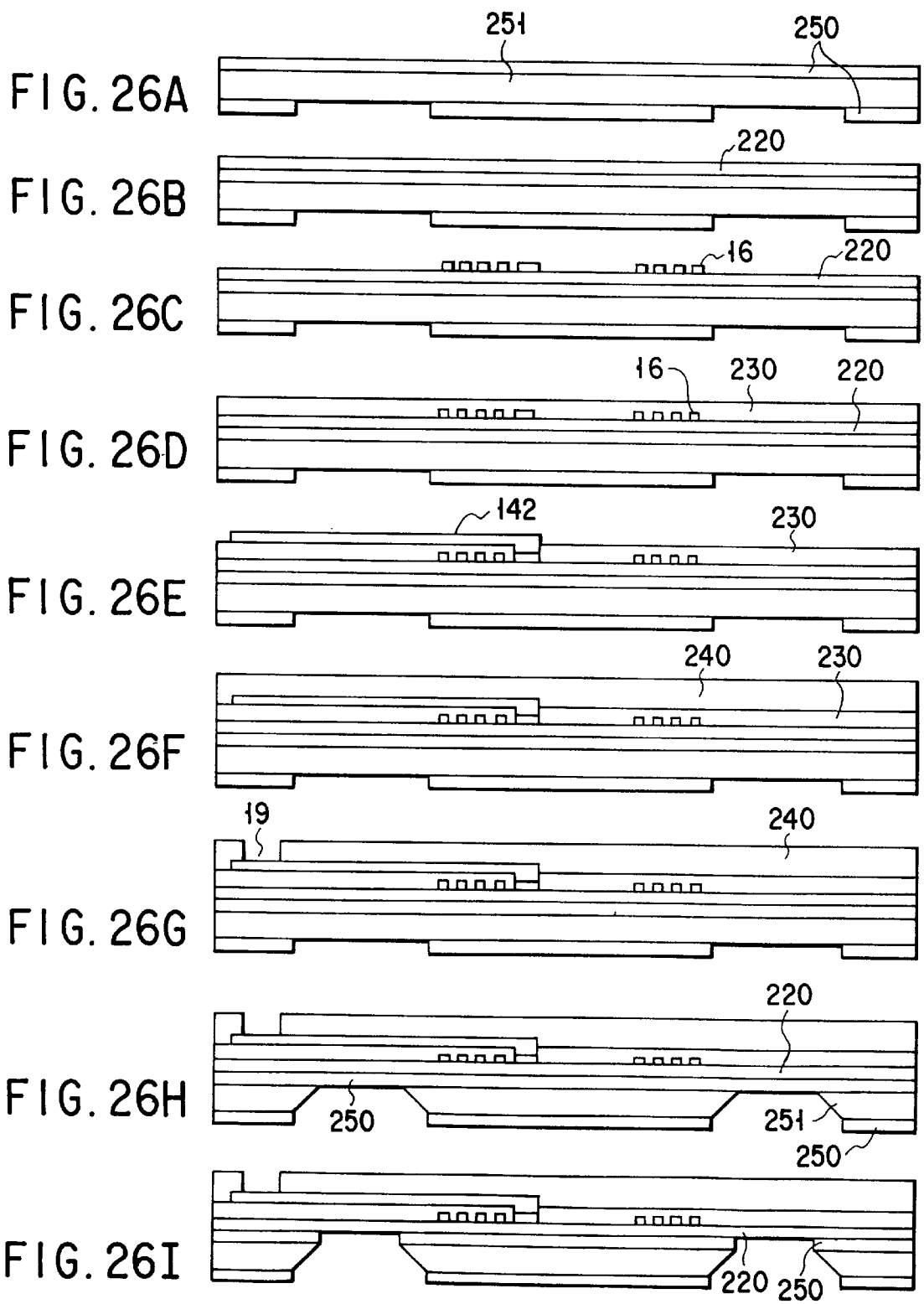

OPTICAL DEFLECTOR COMPRISING A MOVABLE MEMBER HAVING A HIGH RIGIDITY AND A REDUCED MOMENT OF INERTIA AND A METHOD FOR PRODUCING THE SAME

BACKGROUND OF THE INVENTION

The present invention relates to an optical deflector for reflecting a ray from a light source and scanning the reflected ray.

Jpn. Pat. Appln. KOKAI Publication No. 62-210418 discloses an example of conventional optical deflectors. FIG. 29 shows the structure of the optical deflector disclosed in this publication. As shown in FIG. 29, this optical deflector is composed of a movable unit 610, supporting springs 614, magnetic yokes 618, and permanent magnets 619. The movable unit 610 is composed of a mirror 611, a mirror holder 612 and driving coils 613.

Rectangular holes 617 are formed in both ends of the mirror holder 612. Inner ends of the magnetic yokes 618 are inserted into the respective holes 617 so as to oppose the whole surface of magnetic poles of the permanent magnets 619. The driving coils 613 are made on the back side of the mirror 611 so as to surround the respective holes 617. Both of the driving coils 613 have the same shape and the same number of windings. The supporting springs 614 are flat, thin plates. Inner ends of the supporting springs 614 are symmetrically fitted to both sides of the movable unit 610 and the other ends (outer ends) are fixed to respective fixing portions 615 with screws 616. The position of the supporting springs 614 in the X direction is at the center of the movable 610.

The following will describe the operation of this optical deflector. When electric currents having the same amperages are applied to the two driving coils 613, a couple of forces around the Y axis is generated at the two driving coils 613 by the currents passing through the driving coils 613 and a magnetic field generated by the permanent magnets 619 and the magnetic yokes 618 near the driving coils 613. This causes the movable unit 610 to be swung around the Y axis. When the mirror 611 of the movable unit 610 which is being swung is irradiated with a ray such as a laser ray, the laser ray or the like ray reflected on the mirror 611 can be scanned.

Jpn. Pat. Appln. KOKAI Publication No. 1-195414 discloses an example of another optical deflector. As shown in FIG. 30A, in this example, a mirror 4, a driving coil 5 and ligaments 3 are formed in a body to constitute a mirror vibrator 10. This vibrator 10 is held by a frame 2. Next, as shown in FIG. 30B, this frame 2 is stuck on an "L"-like member 8 and a block member 9 and then permanent magnets 6 for excitation are fitted thereto, so as to manufacture an optical deflector.

In the case in which the mirror vibrator 10 is fixed onto the "L"-like member 8 and a block member 9 through the frame 2, from the viewpoint of holding the two ligaments 3, which hold and support the mirror 4 and the driving coil 5 therebetween and are weak, the frame in a reversible U-shaped form is essential.

However, the structure disclosed in the Jpn. Pat. Appln. KOKAI Publication No. 62-210418 has a drawback that the rigidity of the movable unit 610 decreases on the basis of the presence of the holes 617 in the movable unit 610, and an unnecessary resonance is liable to be generated in the case in which the deflector is driven by a high frequency.

Specifically, in the magnetic circuit in the prior art the two magnetic yokes 618 are inserted in the movable unit so that the gaps between the respective magnetic yokes 618 and permanent magnets 619 are narrow. Thus, magnetic-flux densities at the driving coils 613 are strong and thus a driving force generated at the movable unit 610 is large. However, the rigidity of the movable unit 610 decreases on the basis of the presence of the holes 617 in the movable unit 610, and an unnecessary resonance is liable to be generated in the case in which the deflector is driven by a high frequency.

Moreover, the holes 617 are made in the movable unit 610, and accordingly the area of the movable unit 610 becomes large. Furthermore, the moment of inertia can become very large since in the movable unit 610 the mirror having large area and thickness is arranged on the mirror supporter 612 having large area and thickness. In the case in which the moment of inertia is large when the movable unit 610 is driven by a high frequency, inconveniently the deflection angle of the movable unit 610 becomes small.

In the structure of the mirror vibrator 10 having at its single side the frame 2, disclosed in the Jpn. Pat. Appln. KOKAI Publication No. 1-195414, the frame 2 is positioned adjacently to the driving coil 5, and thus the distance between the driving coil 5 and the permanent magnet 6 becomes long on account of the intervention of the frame 2. As a result, the magnetic field from the permanent magnet 6, which acts on the driving coil 5, decreases, thereby making its driving force small. Therefore, there arises a drawback that it is difficult to ensure the driving force. To avoid this drawback, it is permissible that the distance between the frame 2 and the driving coil 5 is made longer, and the permanent magnet 6 is located between them. In this case, however, the size of the chip becomes larger because the distance between the frame 2 and the driving coil 5 is longer, and thus manufacturing costs rise.

It can be considered that after the frame 2 is removed, the mirror vibrator 10 is fixed onto the "L"-like member 8 or a block member 9. However, there arise problems that handling is difficult and its characteristic also changes to a great extent.

Therefore, a first object of the present invention is to provide an optical deflector wherein any unnecessary resonance does not arise by improvement in the rigidity of an movable unit even when the deflector is driven by a high frequency and the driving force of the movable unit is made large by a closed magnetic circuit making the magnetic-flux density in its movable coil large to give a large deflection angle at a small electric power consumption.

A second object of the present invention is to provide an optical deflector which is small-sized and highly efficient and can reduce electric power consumption and stabilize its characteristic by connecting at least two elastic members to a movable plate, separating supporters connected to the respective elastic members, and making at least the supporter, the movable plate and the elastic members monolithically formed in a body, and a method for producing the same.

BRIEF SUMMARY OF THE INVENTION

According to a first aspect of the present invention, an optical deflector comprises:

a supporter, a movable plate on which a mirror face for reflecting light is formed, at least one elastic member for connecting the movable plate and the supporter and holding the movable plate so that the movable plate can deflect, a driving coil which is formed in a ring form on the movable plate in such a manner that the driving coil passes near a movable end of the movable plate when the movable plate deflection-moves, and a magnet and a magnetic yoke generating a closed magnetic circuit for applying a magnetic field to the driving coil in the direction substantially parallel to the plane of the movable plate;

wherein the optical deflector generates a driving force by applying a current to the driving coil inside a magnetic gap of the closed magnetic circuit and deflection-moving the movable plate by elastic deformation of the at least one elastic member, and wherein the magnet is arranged at a position opposite to the movable end of the movable plate outside the driving coil, and the magnet or the magnetic yoke generating the closed magnetic circuit is arranged at a position near the movable plate inside the driving coil to form the magnetic gap.

According to a second aspect of the present invention an optical deflector comprises:

a supporter, a movable plate on which a mirror face for reflecting light is formed, at least one elastic member for connecting the movable plate and the supporter and holding the movable plate so that the movable plate can deflect, a driving coil which is formed in a ring form on the movable plate in such a manner that the driving coil passes near a movable end of the movable plate when the movable plate deflection-moves, and a magnet and a magnetic yoke generating a closed magnetic circuit for applying a magnetic field to the driving coil in the direction substantially parallel to the plane of the movable plate;

wherein the optical deflector generates a driving force by applying a current to the driving coil inside a magnetic gap of the closed magnetic circuit and deflection-moving the movable plate by elastic deformation of the at least one elastic member, a magnetic member generating the closed magnetic circuit is further disposed on the movable plate, and the magnet or the magnetic yoke generating the closed magnetic circuit is arranged at a position opposite to the magnetic member to form the magnetic gap.

According to a third aspect of the present invention, an optical deflector comprises:

a fixing member, supporters which are arranged separately from each other and fixed to the fixing member, a movable plate having a mirror face for reflecting light, elastic members for connecting the movable plate and the supporters, and an actuator for deforming the elastic members elastically to cause a relative displacement of the movable plate from the supporters;

wherein at least the movable plate, the supporters and the elastic members are monolithically formed as a unitary one-piece structure and a part of the actuator is arranged at a position between the supporters.

A fourth aspect of the present invention is a method for manufacturing an optical deflector comprising:

a fixing member, supporters which are arranged separately from each other and fixed to the fixing member, a movable plate having a mirror face for reflecting light, elastic members for connecting the movable plate and the supporters, an actuator for deforming the elastic members elastically to cause a relative displacement of the movable plate from the supporters, and connecting members for connecting the supporters in such a manner that the connecting member can be removed after the supporters are fixed to the fixing member, by monolithically forming at least the movable plate, the supporters, the elastic members, and the connecting members as a unitary one-piece structure, fixing the monolithically formed a resultant unit to the fixing member and then removing the connecting members, and fixing a part of the actuator onto the fixing member at a position where the connecting members are removed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a plane view of a second embodiment of the present invention;

FIG. 8 is a cross section along the VIII—VIII line of the optical deflector shown in FIG. 7;

FIG. 9 is a view showing a second embodiment of the present invention;

FIGS. 26A to 26I are views showing manufacturing steps of the optical deflector according to the ninth embodiment;

DETAILED DESCRIPTION OF THE INVENTION

Referring the drawings, embodiments of the present invention will be described in detail hereinafter. FIGS. 1 to 6 are views for explaining a first embodiment of the present invention.

Figure 1:
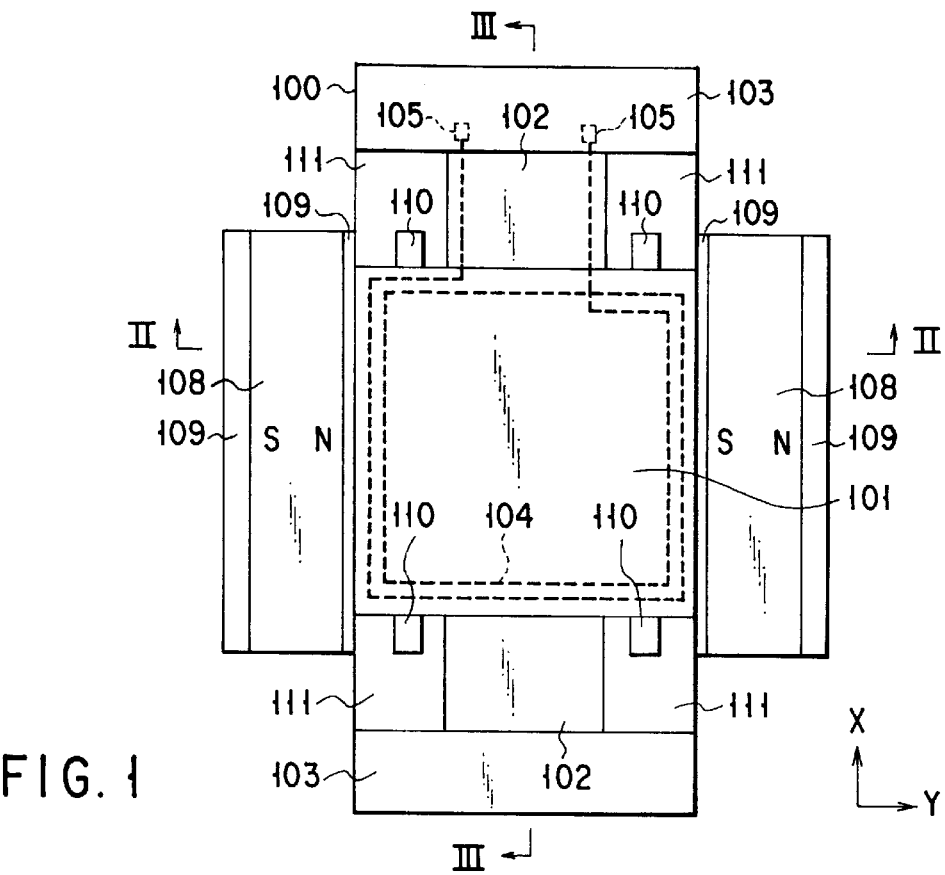
FIG. 1 is a plane view of an optical deflector according to a first embodiment of the present invention.
Figure 2:
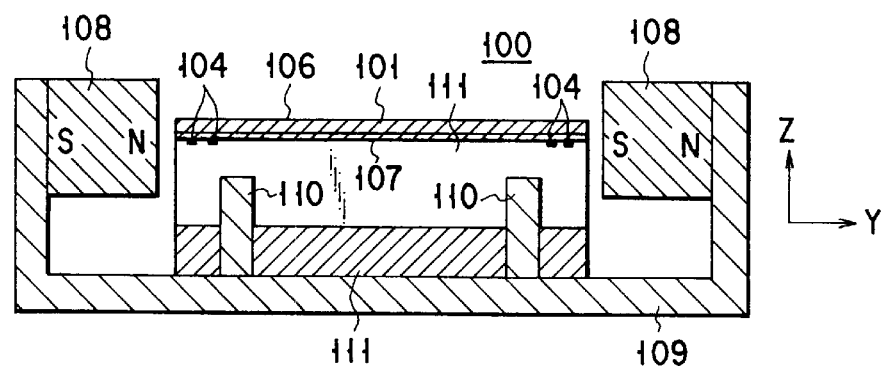
FIG. 2 is a cross section along the II—II line of the optical deflector shown in FIG. 1.
Figure 3:
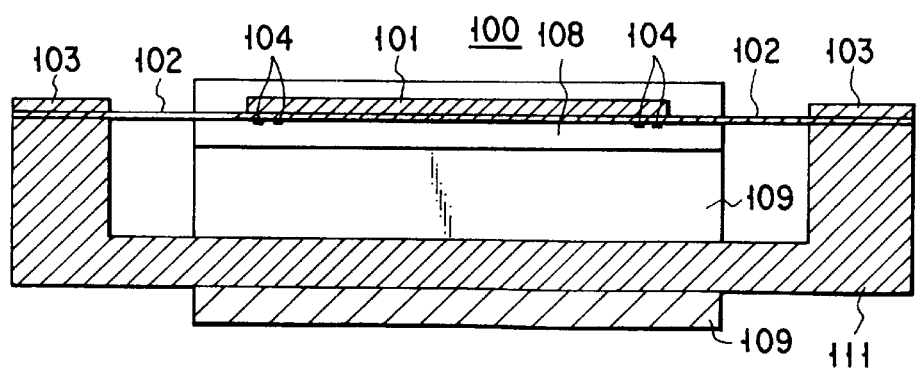
FIG. 3 is a cross section along the III—III line of the optical deflector shown in FIG. 1.
Figure 4:
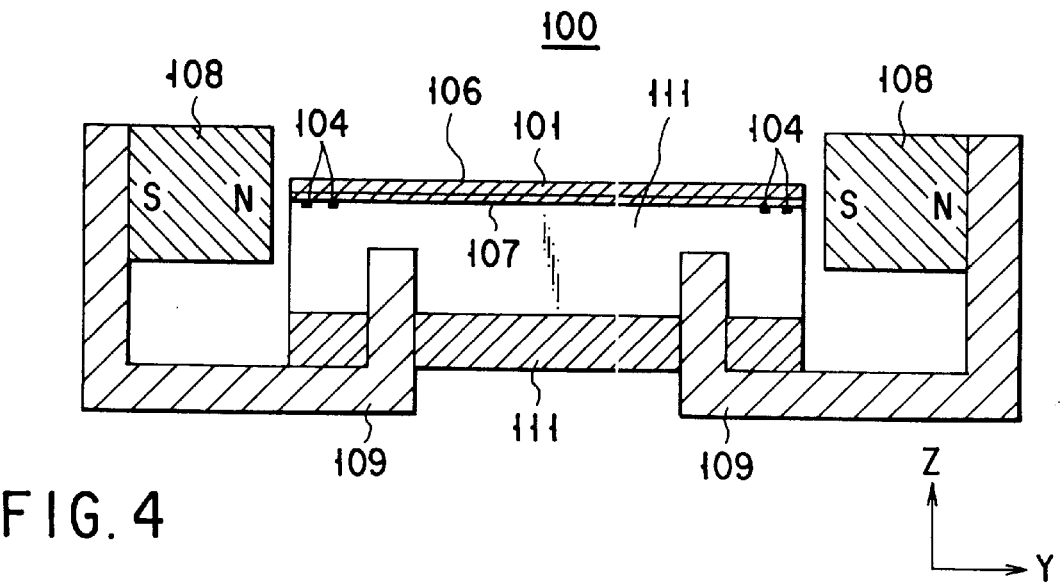
FIG. 4 is a view showing a variation of the first embodiment of the present invention.

FIG. 1 is a plane view of an optical deflector according to the first embodiment of the present invention, FIG. 2 is a cross section along the II—II line in FIG. 1, and FIG. 3 is a cross section along the III—III line FIG. 1.

The optical deflector according to the first embodiment is composed of an optical deflection mirror unit 100, permanent magnets 108, magnetic yokes 109 and 110, a fixing member 111. The optical deflection mirror unit 100 is composed of a movable plate 101, elastic members 102, supporters 103, a driving coil 104, electrode pads 105, and a mirror face 106 as a mirror at the side opposite to a driving coil face 107 on which the driving coil 104 is present. The elastic members 102 have a torsion bar form.

It is preferable that, concerning the respective members of the optical deflection mirror unit 100, the movable plate 101, and the supporters 103 are made mainly of a silicon substrate, which is high rigid material, or the like, that the elastic members 102 are made of an organic insulating material such as polyimide, which has a long life span and can exhibit a large deflection angle, and that the driving coil 104 is made of a material which has a low resistivity, such as aluminum or copper. To raise the driving force of the movable plate 101 and make the deflection angle large, the resistance of the driving coil 104 is made low while the number of its winding is made larger. In addition, the winding is carried out at the position as near as possible to the permanent magnets 108 (as external as possible inside the movable plate 101). The surface of the mirror face 101 may be a polished surface of a silicon substrate. Alternatively, the upper face thereof may be coated with a thin aluminum.

An example of the method for manufacturing the optical deflection mirror unit 100 will be briefly described hereinafter. First, an insulating film, which will be a mask for silicon etching in a subsequent step, is deposited on the back surface of a silicon substrate by a sputtering, CVD, evaporation method or the like, and then a pattern is formed by a photolithographic method. Next, on the front surface of the silicon substrate an organic insulating material which will be the material of the elastic members 102 is made into a film by spin coating, printing or the like, and then a pattern is formed. Thereafter, a metallic film which is a material of the driving coil 104 is made into a film by a sputtering, CVD, evaporation, printing, plating method, or the like, and then a pattern is formed on the surface of the silicon substrate.

In FIG. 1, the driving coil 104 is exposed. However, the structure may be used wherein a further insulating film is deposited on the driving coil 104 so that the driving coil 104 is coated with the insulating film. At last, the formed insulating film is used as a mask to etch the silicon substrate. Thus, the optical deflection mirror unit 100 can be finished. By producing this unit on the same substrate through a semiconductor producing process in the aforementioned way, the movable plate 101, the elastic members 102, the supporter 103, the driving coil 104 and the mirror face 106 can be formed in a body monolithically, thereby making downsizing and mass-production easy.

The following will describe a closed magnetic circuit composed of the permanent magnets 108, and the magnetic yokes 109 and 110.

In the first embodiment, at the outside of the driving coil 104 the permanent magnets 108 are arranged oppositely to movable ends of the movable plate 101, which are ends which can move in a deflective way, and at the inside of the driving coil 104, the magnetic yokes 110 are arranged near the movable plate 101, so as to form magnetic gaps in the closed magnetic circuit. This is a characteristic of the first embodiment. The driving coil 104 is positioned in these magnetic gaps.

In order to make the driving force of the movable plate 101 large, it is necessary to make the magnetic-flux density in the driving coil 104 large. For this, in the present embodiment, the permanent magnet 108 is a magnet which is at least longer than the X direction width of the movable plate 101 and is as wide as possible in the magnetized direction (the Y direction). Additionally, the distance between the permanent magnets 108 and the movable plate 101 is as narrow as possible. Furthermore, the permanent magnets 108 are desirably arranged at the positions where the driving moment of the movable plate 101 becomes the largest.

For this, as shown in FIG. 2, the driving coil face 107 of the optical deflation mirror unit 100 at its neutral position is located to be positioned at the substantial center of the permanent magnet 108 in the Z direction. In order to fix the optical deflection mirror unit 100 to a predetermined position, in the present embodiment the optical deflection mirror unit 100 is fitted to a fixing member 111, as shown in, for example, FIG. 3.

The two permanent magnets 108 are connected with each other through the substantially U-shaped magnetic yoke 109, on the section along the A-A' line, in such a manner that the magnets 108 cover, among the two magnetic poles, the pole opposite to the side at which the movable plate 101 is arranged (the outside pole). This makes it possible to reduce the leakage of the magnetic field generated from the magnets 108 and make the magnetic-flux density in the driving coil 104 large.

Furthermore, the magnetic yoke 109 has two magnetic yokes 110. These two magnetic yokes 110 are arranged to be at the position opposite to the side where the permanent magnets 108 are disposed, with the driving coil 104 being centered in the Y direction, and to have such a height that the yokes 110 are projected from the bottom surface of the magnetic yoke 109 and approaches the lower surface of the movable plate 101 in the Z direction. It is preferred that the position of the magnetic yokes 110 in the Y direction is nearer to the driving coil 104. The magnetic yokes 110 and the permanent magnets 108 constitute a closed magnetic circuit, so as to make the magnetic-flux density in the driving coil larger.

Figure 29:
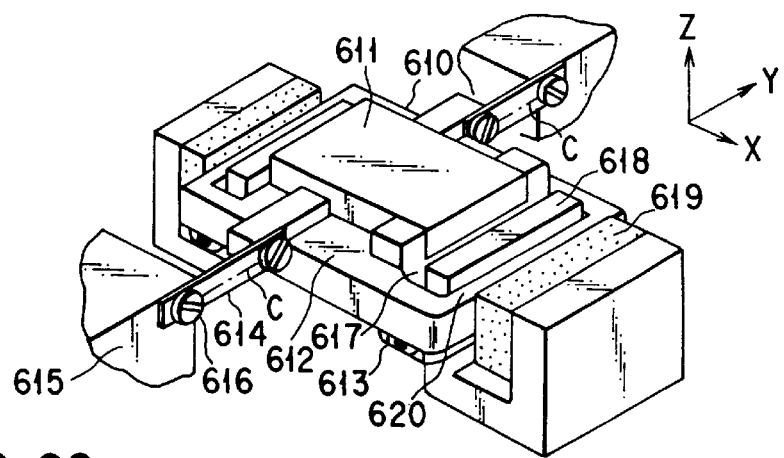
FIG. 29 is a view showing a structure of a conventional optical deflector.
Figure 30A:
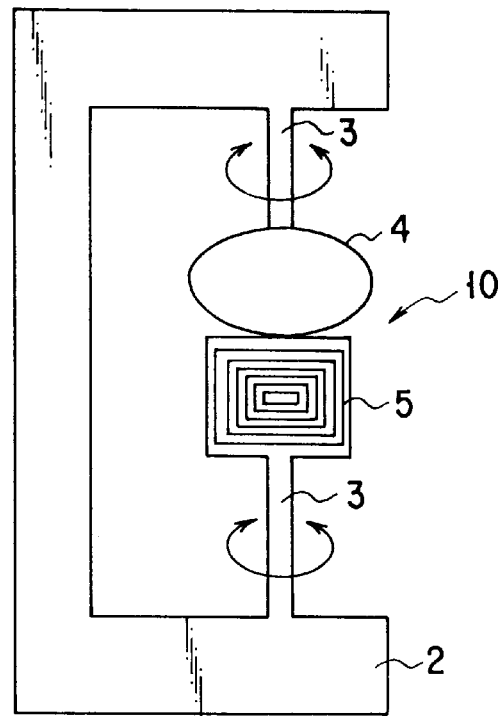
FIGS. 30A and 30B are views showing a structure of a conventional optical deflector.
Figure 30B:
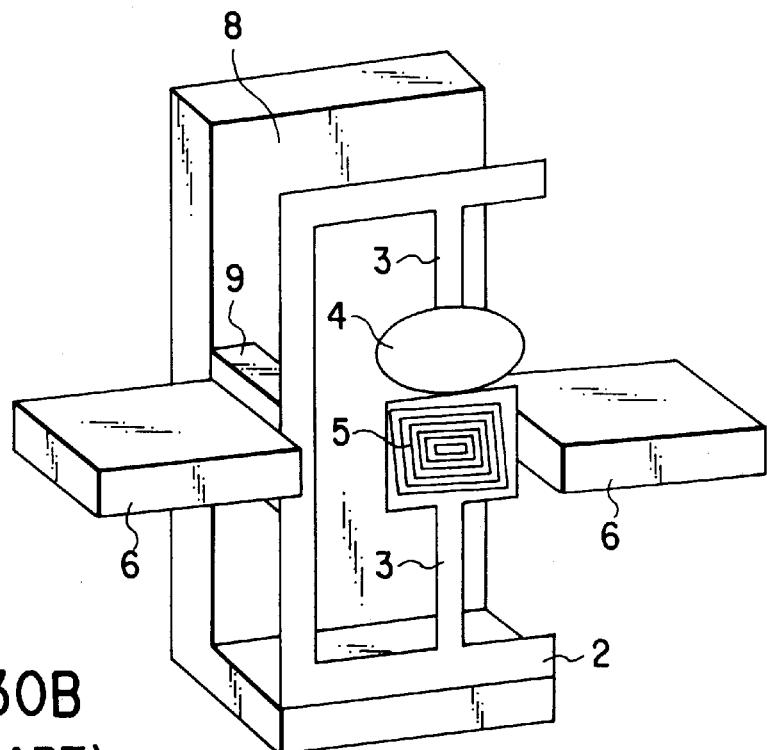

As shown in FIG. 29, in the case in which the magnetic yokes 18 are completely opposite to the magnetic pole of the permanent magnets 19, it is known from simulations that the magnetic density inside the magnetic gap becomes large. However, even in the case in which the magnetic yokes 110 are partly opposite to the magnetic pole of the permanent magnets 108 as shown in FIG. 2, the magnetic-flux density in the magnetic gaps hardly decrease and a larger magnetic-flux density can be obtained than magnetic circuits having no magnetic yoke.

The following will describe the effect of the first embodiment.

When an alternating current is applied through the electrode pads 105, a Lorentz force in the Z direction is generated at the driving coil 104 near the permanent magnets 108 by the interaction of the current in the X direction passing through the driving coil 104 near the permanent magnets 108 and the magnetic field in the Y direction generated from the permanent magnets 108. If the polarity of the permanent magnets 108 at both the sides is set in the same direction, Lorentz forces at the driving coil 104 near the respective permanent magnets 108 work in directions opposite to each other and thus the movable member 101 is swung in the manner that an axis in the X direction of the elastic members 102 is centered.

In order to make the driving force of the movable plate 101 large, it is enough that the alternating current applied to the driving coil 104 is made large, but electric power consumption becomes large for that. Therefore, in order to enlarge the deflection angle of the movable plate 101, it is necessary to make the magnetic-flux density in the driving coil 104 as large as possible.

In this way, no hole is made in the movable plate 101 in the first embodiment, and consequently the rigidity of the movable plate 101 becomes high. This does not cause an unnecessary resonance to be generated even when the deflector is driven by a high frequency, thereby giving smooth vibration. Moreover, by a decrease in the moment of inertia of the movable plate 101, a large deflection angle can be obtained even if the deflector is driven by a high frequency, and further by the closed magnetic circuit composed of the permanent magnets 108 and the magnetic yokes 110 and arranged near the driving coil 104, the magnetic-flux density in the driving coil 104 becomes large. For these reasons, it is possible to obtain an optical deflector having a torsion bar structure wherein a large deflection angle can be obtained at a little electric power consumption. Moreover, in the case in which the amplitude of the movable plate 101 becomes larger than required, the magnetic yokes 110 have a function as a stopper, too.

The function of the optical deflector is a function of irradiating the mirror face 106 of the movable plate 101 with a ray such as a laser ray while swinging the movable plate 101 to scan the resultant reflective ray.

The closed magnetic circuit in the present embodiment is not limited to one illustrated in FIG. 1. The advantageous effects can be obtained even by two closed magnetic circuits comprising separated magnetic yokes 109, as shown in, for example, FIG. 4.

Figure 5:
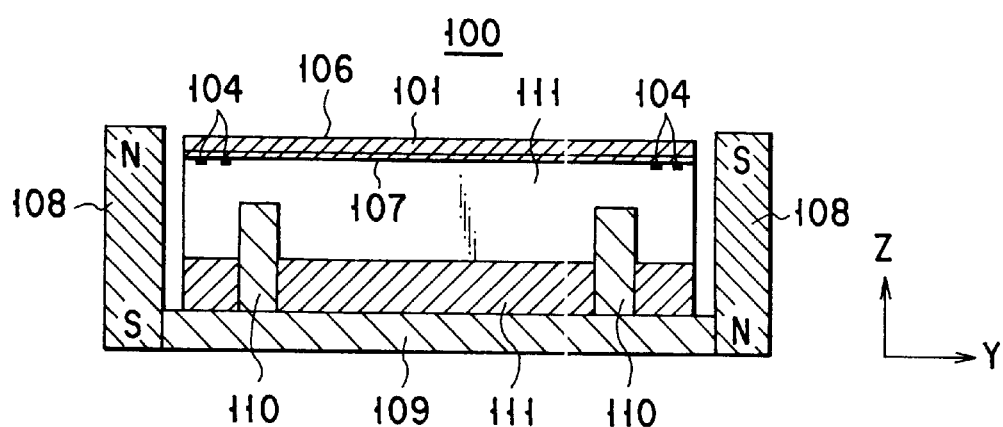
FIG. 5 is a view of another variation of the first embodiment of the present invention.

As illustrated in FIG. 5, the closed magnetic circuit in the present embodiment may be made in such a manner that the magnetized direction of the permanent magnets 108 is along the Z direction. In this case, however, to ensure the driving force, it is desired that the driving coil face 107 of the optical deflection mirror unit 100 at its neutral position is located near the upper end of the permanent magnets 108.

Figure 6:
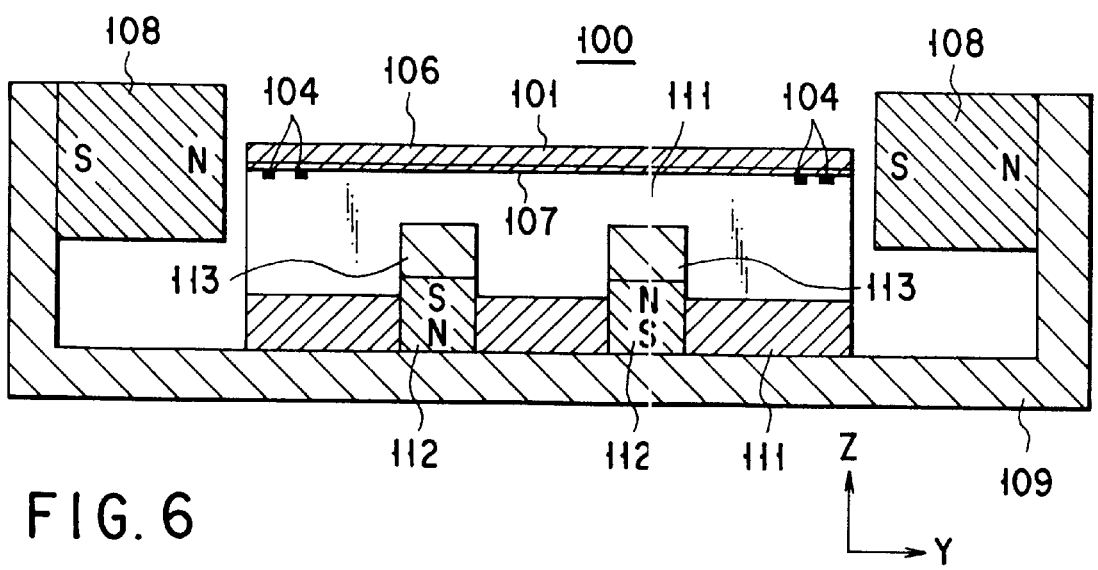
FIG. 6 is a view of still another variation of the first embodiment of the present invention.

As illustrated in FIG. 6, the closed magnetic circuit in the present embodiment may be a structure wherein two permanent magnets 112 are arranged at the side opposite to the side wherein the permanent magnets 108 are arranged, with the driving coil 104 being centered in the Y direction, and further magnetic yokes 113 are arranged on the respective permanent magnets, or a structure having only the permanent magnets 112. However, if the permanent magnets 112 and the magnetic yokes 113 are near the driving coil 104 in the Y direction, inconveniently the direction of the magnetic-flux density in the driving coil 104 becomes the Z direction. Thus, in order to make the magnetic field in the Y direction larger, it is desired that the permanent magnets 112 and the magnetic yokes 113 are arranged, to some extent, apart from the driving coil 104.

The following will describe a second embodiment of the present invention. FIG. 7 is a plane view of an optical deflector according to the second embodiment, and FIG. 8 is a cross section along the VIII—VIII line in FIG. 7. As shown in FIGS. 7 and 8, the second embodiment has a structure wherein an elastic member 202 is held at a single side (which may be referred to as "a cantilever structure" hereinafter). Reference numbers 200 to 209 and 211 which are attached to respective members correspond in turn to the reference numbers 100 to 109 and 111 used in the first embodiment. The corresponding members represent the same members. The manufacturing method of the second embodiment is also the same as that of the first embodiment, and the respective members of the optical deflection mirror unit 200 are formed on the same substrate.

The driving of the movable plate 201 of the second embodiment is as follows. When an alternating current is applied through the electrode pads 205, a Lorentz force in the Z direction is generated at the driving coil 204 near the permanent magnet 208 by the interaction of the current in the X direction passing through the driving coil 204 near the permanent magnet 208 and the magnetic field in the Y direction generated from the permanent magnet 208. Since the movable plate 201 has a cantilever structure, a vibration having a translation component and a rotation component is generated.

In this case, the directions of the current at the driving coil 204 at the side of the permanent magnet 208 and the current at the driving coil 204 at the side of elastic member 202 are opposite to each other, and thus the directions of Lorentz forces at the respective sides of the driving coils 204 are opposite to each other. In order to enlarge the defection angle of the movable plate 201, it is necessary to make the magnetic-flux density in the driving coil 204 at the side of the permanent magnet 208 as large as possible, and make the magnetic-flux density in the driving coil 204 at the side of the elastic member 202 as small as possible. For this, it is desired that the driving coil 204 is arranged as externally as possible, inside the movable plate 201. Of course, it is desired that the permanent magnet 208 is arranged as near as possible to the movable plate 201, and the driving coil face 207 at the neutral position is located near the center of the permanent magnet 208 in the Z direction.

The following will explain the magnetic yoke 209. The permanent magnet 208 is connected with the magnetic yoke 209 so that the yoke 209 covers, among the two magnetic poles, the magnetic pole at the side opposite to the side where the movable plate 201 is arranged (at the external side). In this way, it is possible to reduce the leakage of the magnetic field generated from the permanent magnet 208 and increase the magnetic-flux density in the driving coil 204. The magnetic yoke 209 is arranged to be at the position opposite to the side where the permanent magnet 208 is disposed, with the driving coil 204 being centered in the Y direction, and to have such a height that the yoke 209 is projected from the bottom surface of the magnetic yoke 209 and approaches the lower surface of the movable plate 201 in the Z direction.

It is preferred that the position of the magnetic yoke 209 in the Y direction is nearer to the driving coil 204. The magnetic yoke 209 and the permanent magnet 208 constitute a closed magnetic circuit, so as to make the magnetic-flux density in the driving coil 204 inside the magnetic gap far larger.

According to the second embodiment, in the same manner as in the first embodiment the rigidity of the movable plate becomes high. This causes an unnecessary resonance not to be generated even when the deflector is driven by a high frequency, thereby giving smooth vibration. Moreover, by a decrease in the moment of inertia of the movable plate, a large deflection angle can be obtained even if the deflector is driven by a high frequency, and further by the closed magnetic circuit composed of the permanent magnet and the magnetic yoke 209 and arranged near the driving coil 204, the magnetic-flux density in the driving coil 204 becomes large. For these reasons, it is possible to obtain an optical deflector which has a structure wherein the elastic member is held at its single side and which can give a large reflection angle at a little electric power consumption. Moreover, in the case in which the amplitude of the movable plate 201 becomes larger than required, the inner end of the magnetic yoke 209 has a function as a stopper, too.

Figure 10:
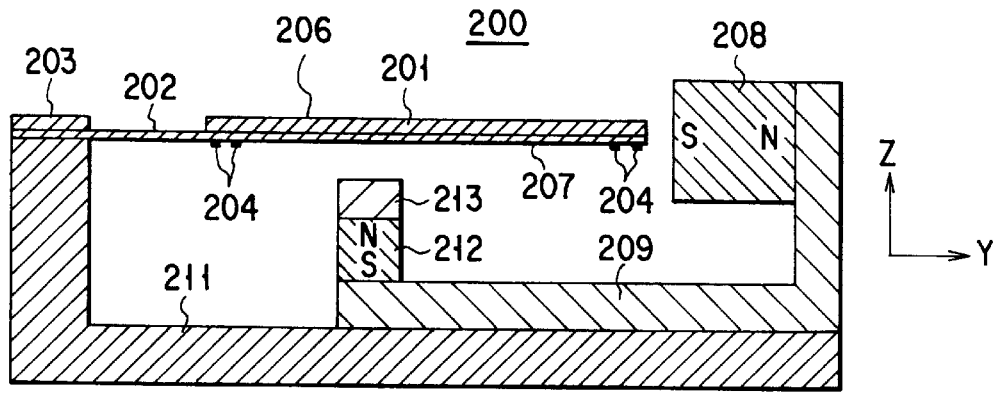
FIG. 10 is a view showing a variation of the second embodiment of the present invention.

The closed magnetic circuit in the second embodiment is not limited to one illustrated in FIGS. 7 and 8. The same advantageous effects can be obtained even by a structure as shown in, for example, FIG. 9 wherein the magnetized direction of the permanent magnet 208 is made along the Z direction; a structure as shown in FIG. 10 wherein a permanent magnet 212 is arranged at the side opposite to the side where the permanent magnet 208 is arranged, with the driving coils 204 being centered in the Y direction, and further a magnetic yoke 213 is arranged on the permanent magnet; or a structure having only the permanent magnets 212.

Figure 11:
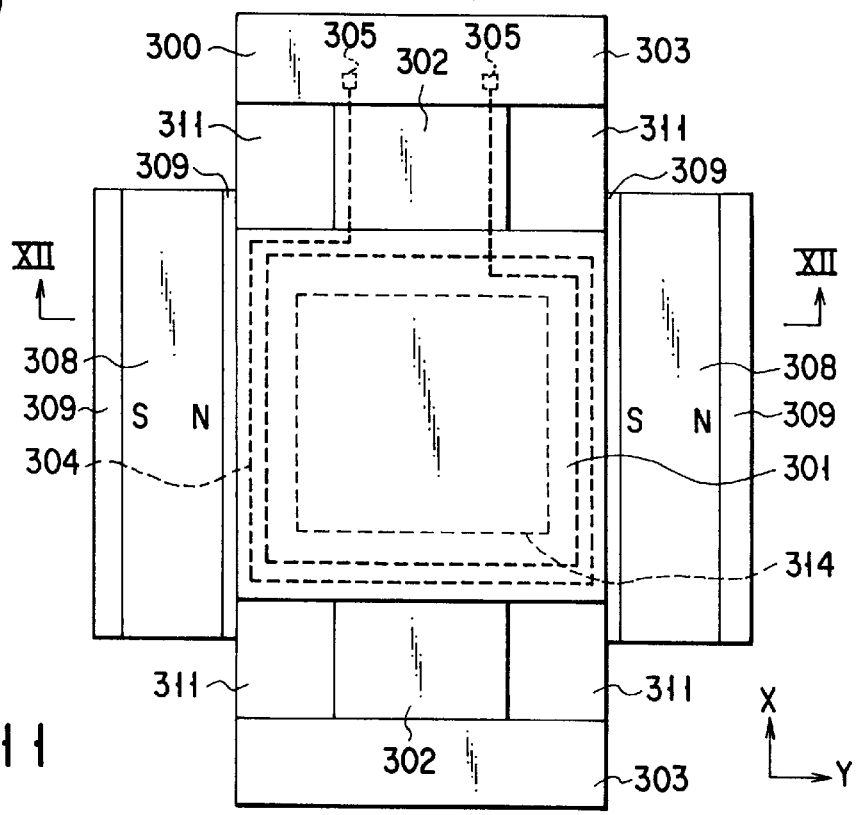
FIG. 11 is a plane view of a third embodiment of the present invention.
Figure 12:
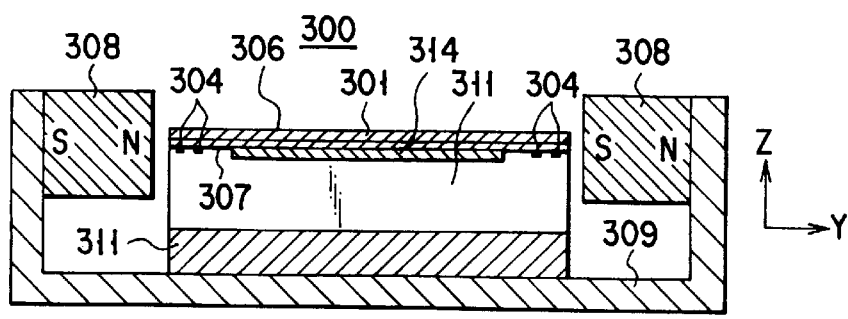
FIG. 12 is a cross section along the XII—XII line of the optical deflector shown in FIG. 11.

The following will describe a third embodiment of the present invention. FIG. 11 is a plane view of an optical deflector according to the third embodiment, and FIG. 12 is a cross section along the XII—XII line in FIG. 11. Reference numbers 300 to 309 and 311 which are attached to respective members correspond in turn to the reference numbers 100 to 109 and 111 used in the first embodiment. The corresponding members are the same members. Reference number 314 represents magnetic members. The elastic members 302 have a torsion bar structure.

In the third embodiment, the magnetic member 314 is formed inside the driving coil 304 on the movable plate 301 by a sputtering, evaporation, plating, printing method, or the like. It is desired that the material thereof is Ni-based or Ni—Fe-based alloy, or Ni—Fe—Mo permalloy, or the like.

In the third embodiment, a closed magnetic circuit is composed of the permanent magnets 308, the magnetic yoke 309, and the magnetic member 314. At the outside of the driving coil 304, the permanent magnets 308 are arranged at the positions corresponding to movable ends of the movable plate 301, so as to form magnetic gaps between the magnets 308 and the magnetic member 314. This magnetic gaps are formed at the two respective movable ends of the movable plate 301 and the driving coil 304 is positioned inside both the magnetic gaps.

Formation of such a magnetic member 314 makes it possible to reduce the leakage magnetic field between the two permanent magnets 308 and to make the magnetic-flux density in the driving coil 304 larger. Furthermore, the center of gravity of the movable plate 301 in the Z direction becomes near to the elastic members 302, and consequently the vibration of the movable plate 301 is made smoother. If the magnetic member 314 is disposed, however, the moment of inertia of the movable plate 301 becomes large. For this, it is desired that in the case in which the movable plate 301 is a silicon substrate, the thickness of the magnetic member 314 is one tenth as thick as that of the movable plate 301, or less.

According to the third embodiment, in the same manner as in the first and second embodiments the rigidity of the movable plate 301 becomes high, and its moment of inertia is reduced, and the magnetic-flux density in the driving coil 304 becomes far larger by the magnetic member 314. Thus, it is possible to obtain an optical deflector which can give a large reflection angle at less electric power consumption. Moreover, the height of the gravity center of the movable plate 301 becomes near to the elastic members 302, and thus a smoother vibration of the movable plate 301 can be realized in the same manner as in the first and second embodiments.

Figure 13:
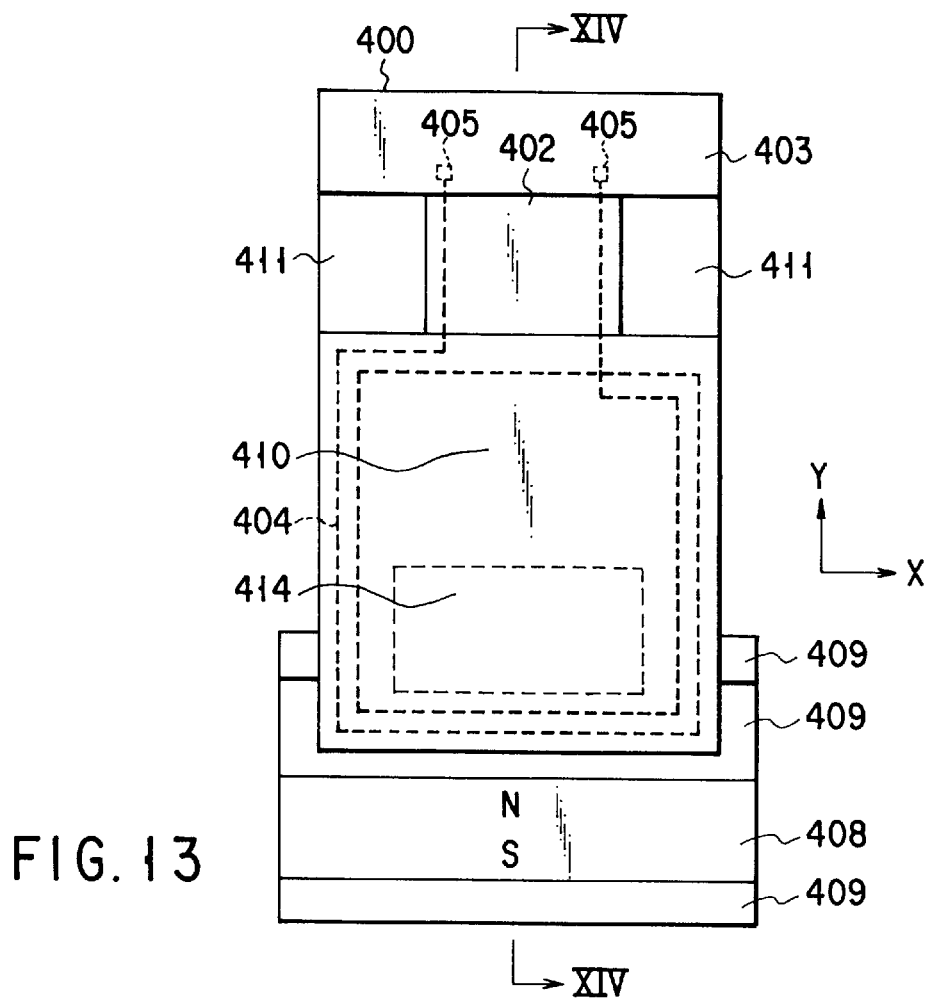
FIG. 13 is a plane view of an optical deflector according to a fourth embodiment of the present invention.
Figure 14:
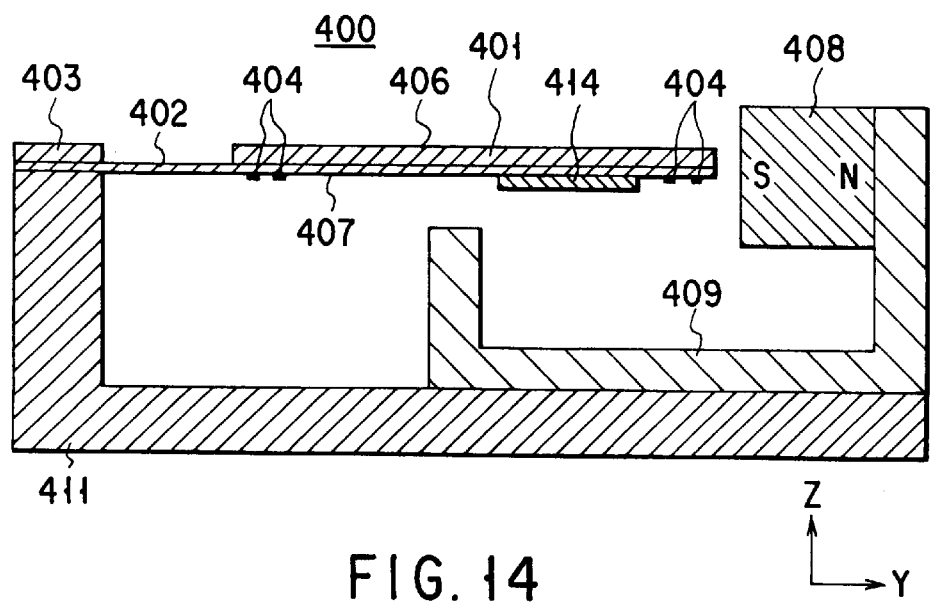
FIG. 14 is a cross section along the XIV—XIV line of the optical deflector shown in FIG. 13.

The following will describe a fourth embodiment. FIG. 13 is a plane view of the optical deflector according to the fourth embodiment. FIG. 14 is a cross section along the XIV—XIV line in FIG. 13. As illustrated in FIGS. 13 and 14, the fourth embodiment has a cantilever structure. Reference numbers 400 to 409, 411 and 414 which are attached to respective members correspond in turn to the reference numbers 300 to 309, 311 and 314 used in the first embodiment. The corresponding members represent the same members.

In the fourth embodiment, the closed magnetic circuit is composed of the permanent magnet 408, the magnetic yoke 409, and the magnetic member 414, and the permanent magnet 408 is arranged at the position corresponding to a movable end of the movable plate 401 outside the driving coil 404 to form a magnetic gap between the permanent magnet 408 and the magnetic member 414. The driving coil 404 is positioned inside this magnetic gap.

In the same manner as in the first and second embodiments, of course, the closed magnetic circuit in the third and fourth embodiments may have a structure wherein the magnetized direction of the permanent magnet is made along the Z direction, a structure wherein a single or two additional magnets are disposed at the position(s) opposite to the side where the aforementioned permanent magnet is arranged, with the driving coil being centered in the Y direction and further a magnetic yoke is arranged on the additional permanent magnet or a structure which has only the additional permanent magnet.

The following will describe a fifth embodiment. The optical deflector of this embodiment is characterized by having a closed magnetic circuit which can give a large deflection angle at a little electric power consumption in the state that a supporter connected to both elastic members having a torsion bar structure is not separated.

Figure 15:
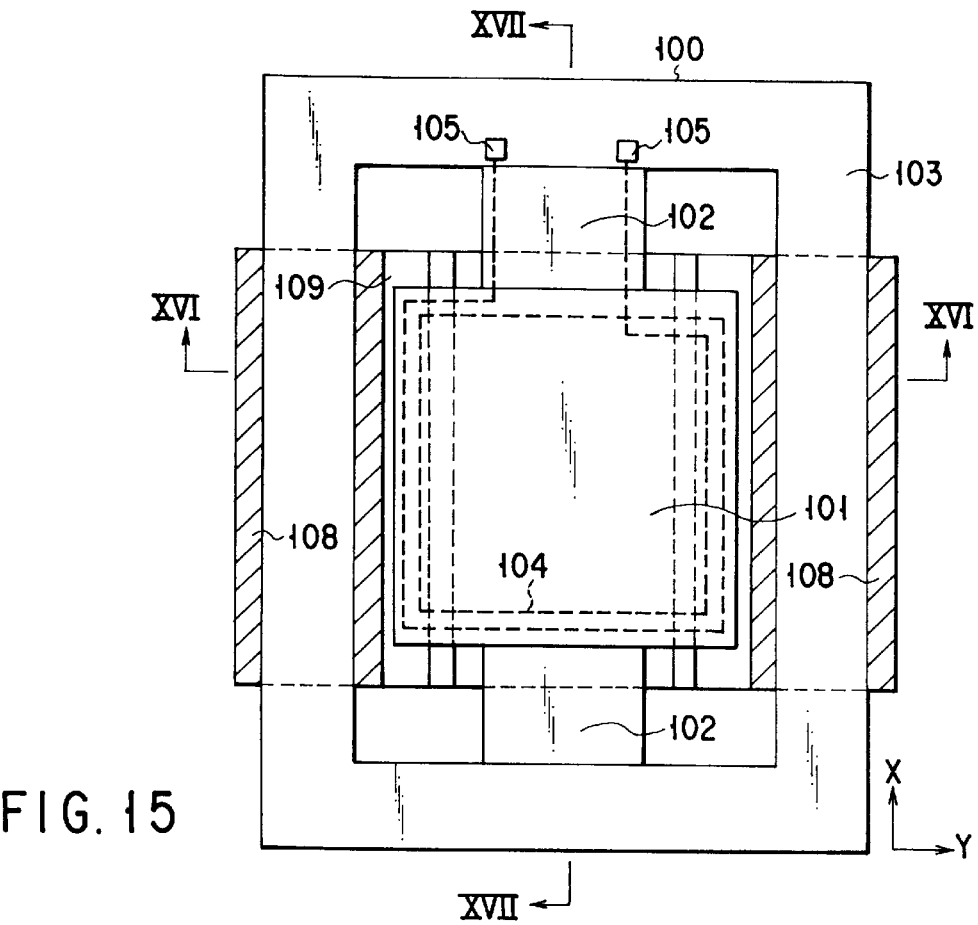
FIG. 15 is a plane view of a fifth embodiment of the present invention.
Figure 16:
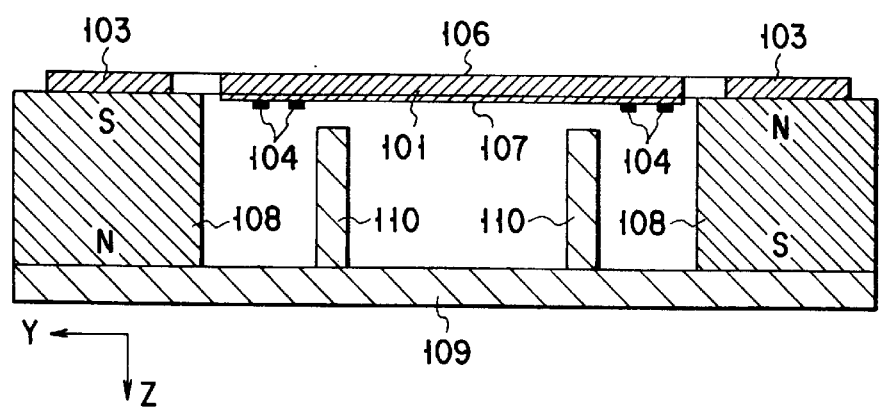
FIG. 16 is a cross section along the XVI—XVI line of the optical deflector shown in FIG. 15.
Figure 17:
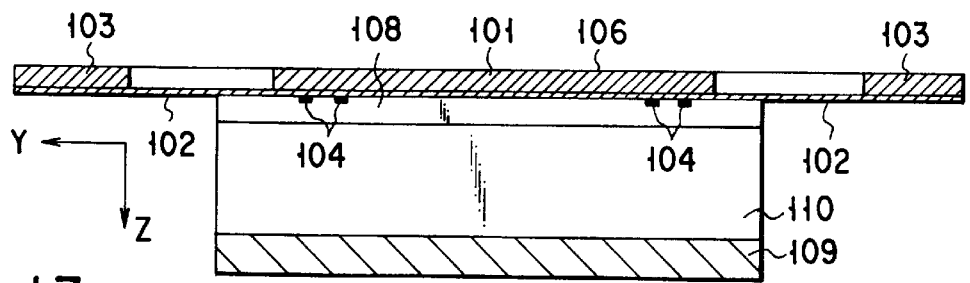
FIG. 17 is a cross section along the XVII—XVII line of the optical deflector shown in FIG. 15.

FIG. 15 is a plane view of the optical deflector according to the fifth embodiment, FIG. 16 is a cross section along the XVI—XVI line in FIG. 15 and FIG. 17 is a cross section along the XVII—XVII line in FIG. 15. Reference numbers which are attached to respective members correspond to the reference numbers used in the first embodiment. The corresponding members represent the same members.

This embodiment relates to an optical deflector wherein a supporter is not fitted to a fixing member and the supporter for connecting both elastic members is not separated.

A closed magnetic circuit of the present embodiment will be described. As shown in FIG. 15, in order that the permanent magnets 108 are arranged near the driving coil 104 outside the driving coil 104, the permanent magnets 108 are bonded onto the supporter 103 so as to sandwich the elastic members 102. Since the driving coil 104 cannot be arranged at the center of the magnetized face of the permanent magnets 108 in the Z direction by the presence of the supporter 103, making the magnetized direction of the permanent magnets 108 along the Z direction (the thickness direction of the movable plate) can permit the magnetic-flux density in the driving coil 104 in the Y direction to become far larger than making the magnetized direction of the permanent magnets 108 along the Y direction. Therefore, in order to make the driving force of the driving coil large, the magnetized direction of the permanent magnets 108 is made along the Z direction and the magnetized-area-width is made as large as possible. Moreover, the directions of the magnetic poles of the permanent magnets 108 are made opposite to each other.

Next, in order to reduce the leakage of the magnetic field generated from the permanent magnets 108, the magnetic poles of the two permanent magnets 108 at the side opposite to the supporter 103 are connected to each other through the magnetic yoke 109. Furthermore, in the same manner as in the first embodiment, the magnetic yokes 110 are arranged to be at the positions opposite to the side where the permanent magnets 108 are disposed, with the driving coil 104 being centered in the Y direction, and at the positions near both ends of the movable plate 101, with both the elastic members 102 being centered in the Z direction. This makes it possible to form magnetic gaps between the magnetic yokes 110 and the permanent magnets 108, so that the driving coil 104 is positioned inside the magnetic gaps. To make the magnetic-flux density in the driving coil 104 in the Y direction as large as possible, it is preferred that the position of the magnetic yokes 110 in the Y direction is nearer to the driving coil 104. The presence of the magnetic yokes 110 cause the magnetic-flux density in the driving coil 104 to be made larger.

According to the fifth embodiment, even if the supporter 103 connected to both the elastic members 102 is not separated, it is possible to obtain an optical deflector which has a torsion bar structure and which can give a large deflection angle at a little electric power consumption in the same manner as in the first embodiment. The effect of the present embodiment is the same as that of the first embodiment.

Figure 18:
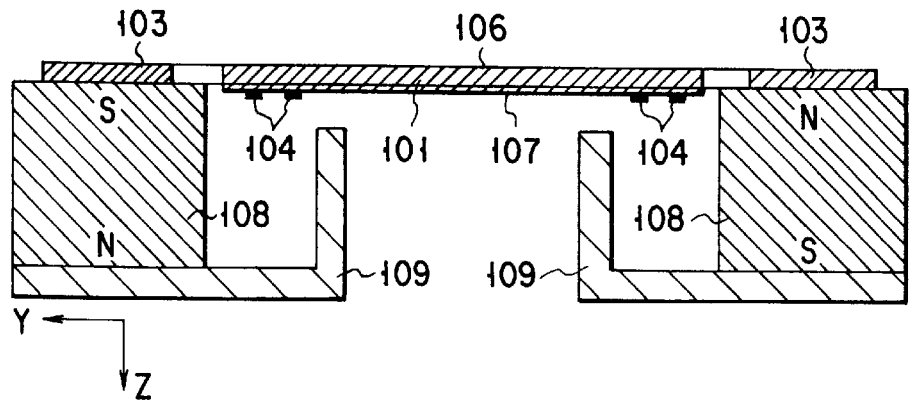
FIG. 18 is a view showing a variation of the fifth embodiment of the present invention.

The closed magnetic circuit in the fifth embodiment is not limited to one illustrated in FIG. 16. The same advantageous effects can be obtained by two closed magnetic circuits comprising separated magnetic yokes 109, as shown in FIG. 18 in the same manner as in the first embodiment.

Figure 19:
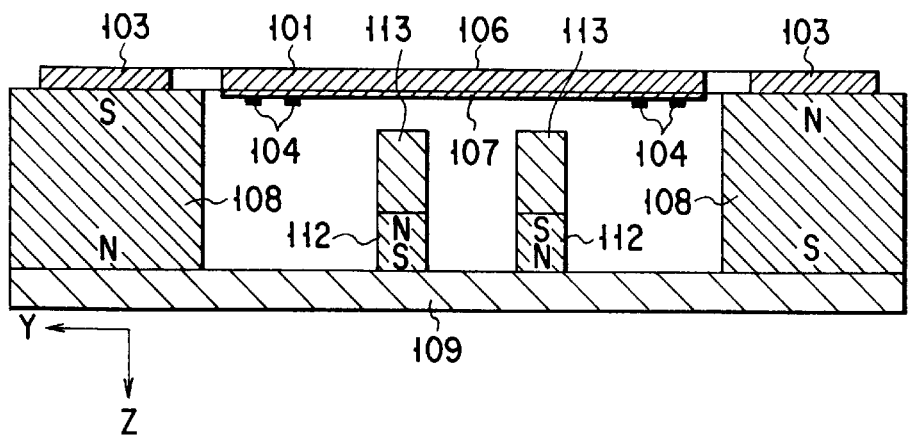
FIG. 19 is a view showing another variation of the fifth embodiment of the present invention.

As illustrated in FIG. 19, the closed magnetic circuit in the fifth embodiment may be a structure wherein two permanent magnets 112 are arranged at the side opposite to the side wherein the permanent magnets 108 are disposed, with the driving coil 104 being centered in the Y direction, and further magnetic yokes 113 are arranged on the respective permanent magnets 108, or a structure having only the permanent magnets 112.

Figure 20:
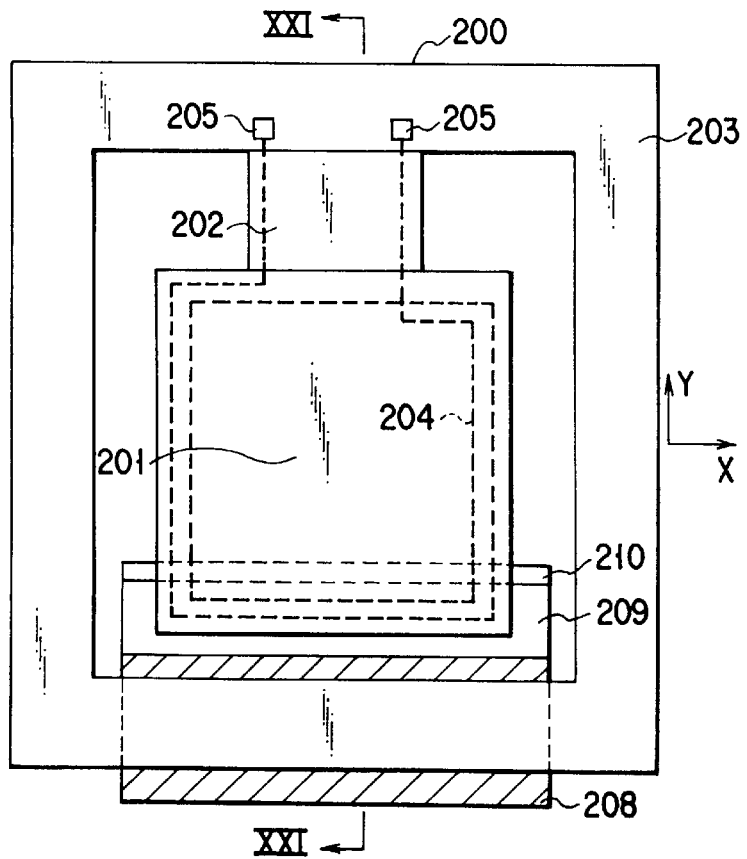
FIG. 20 is a plane view of a sixth embodiment of the present invention.
Figure 21:
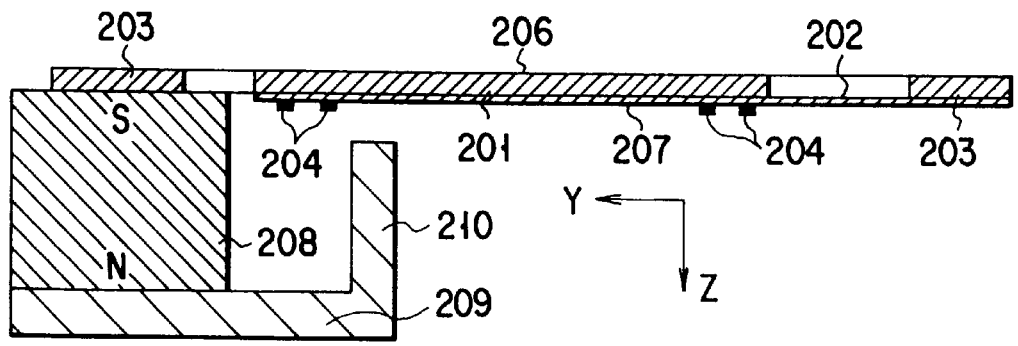
FIG. 21 is a cross section along the XXI—XXI line of the optical deflector shown in FIG. 20.

The following will describe a sixth embodiment. FIG. 20 is a plane view of the optical deflector according to the sixth embodiment, FIG. 21 is a cross section along the XXI—XXI line in FIG. 20. Reference numbers which are attached to respective members correspond to the reference numbers used in the first embodiment. The corresponding members represent the same members.

As shown in FIGS. 20 and 21, the optical deflection mirror unit 200 has a single end held structure. In the same manner as in the fifth embodiment, its supporter is not fitted to a base frame, and the supporter connected to an elastic member is not separated from the opposite supporter.

The following will describe its magnetic circuit. At the outside of the driving coil 204, the permanent magnet 208 magnetized in the Z direction is bonded onto the supporter 203 at the side opposite to the elastic member 202. Next, to reduce the leakage of the magnetic field generated from the permanent magnet 208, the magnetic yoke 209 is connected to the magnetic pole of the permanent magnet 208 at the side opposite to the supporter 203. A magnetic yoke 210 is integrated with the magnetic yoke 209 at the position adjacent to the movable plate 201 in the Z direction to form a magnetic gap between the magnetic yoke 210 and the permanent magnet 208. The driving coil 204 is positioned inside the this magnetic gap. To make the magnetic-flux density in the driving coil 204 in the Y direction as large as possible, it is desired that the position of the magnetic yoke 210 in the Y direction is near to the driving coil 204.

According to the sixth embodiment, even if the supporter connected to the elastic member is not separated from the opposite supporter, it is possible to obtain an optical deflector which has a single-end held structure and which can give a large deflection angle at a little electric power consumption in the same manner as in the second embodiment. The effect of the present embodiment is the same as that of the second embodiment.

The closed magnetic circuit in the sixth embodiment is not limited to one illustrated in FIG. 21, and may be a structure wherein an additional permanent magnet is arranged at the side opposite to the side wherein the aforementioned permanent magnet is arranged, with the driving coil being centered in the Y direction, and further an additional magnetic yoke is arranged on the permanent magnet, or a structure having only the additional permanent magnet, in the same manner as in the variations of the fifth embodiment. (These structures are not illustrated.)

The following will describe a seventh embodiment. The optical deflector of this embodiment is characterized by having, in an optical deflection mirror unit having a torsion bar structure wherein a magnetic member is arranged inside a driving coil on a movable plate, a closed magnetic circuit which can give a large deflection angle at a little electric power consumption in the state that a supporter connected to both elastic members is not separated, in the same manner as in the third embodiment.

Figure 22:
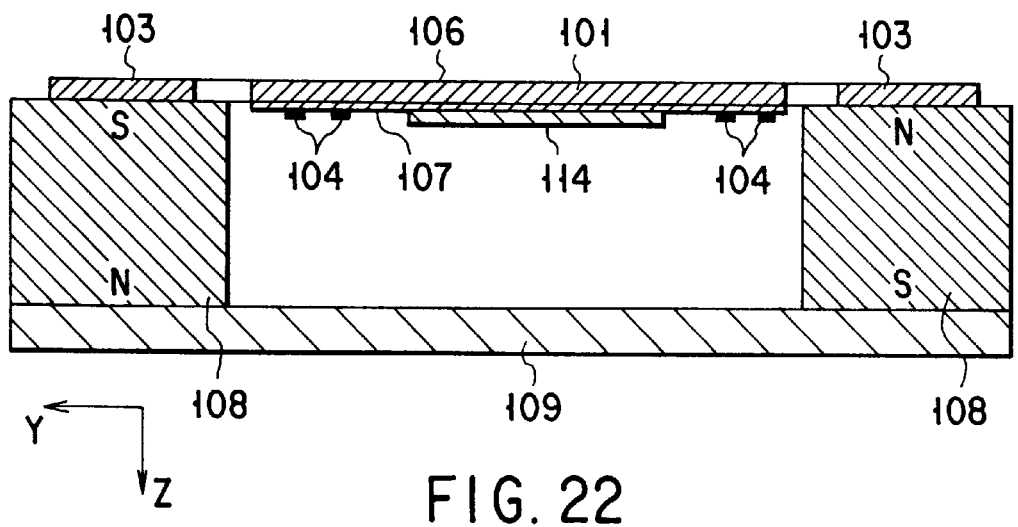
FIG. 22 is a cross section showing an optical deflector according to a seventh embodiment of the present invention.

FIG. 22 shows a cross section of the seventh embodiment, which is similar to FIG. 12. Its closed magnetic circuit will be described. At the outside of the driving coil 104, two permanent magnets 108 magnetized in the Z direction are bonded onto the supporter 103 for both elastic members. Next, to reduce the leakage of the magnetic field generated from the permanent magnets 108, the magnetic poles of the permanent magnets 108 at the side opposite to the supporter 103 connected to the two permanent magnets 108 are connected through the magnetic yoke 109. In this closed magnetic circuit, magnetic gaps are formed between the permanent magnets 108 and the magnetic member. The driving coil 104 is positioned inside these magnetic gaps. In the same manner as in the third embodiment, arrangement of the magnetic member makes it possible to reduce the leakage magnetic field between the two permanent magnets 108 and enlarge the magnetic-flux density in the driving coil 104. Furthermore, by making the center of gravity of the. movable plate 101 in the Z direction near to the elastic members, the generation of an unnecessary mode vibration can be suppressed. The effect of the present embodiment is the same as that of the third embodiment.

The following will describe an eighth embodiment. The optical deflector of the eighth embodiment is characterized by having in an optical deflection mirror unit having a single end held structure wherein a magnetic member is arranged inside a driving coil on a movable plate, a closed magnetic circuit which can give a large deflection angle at a little electric power consumption in the state that a supporter connected to an elastic member is not separated from the opposite supporter, in the same manner as in the fourth embodiment.

Figure 23:
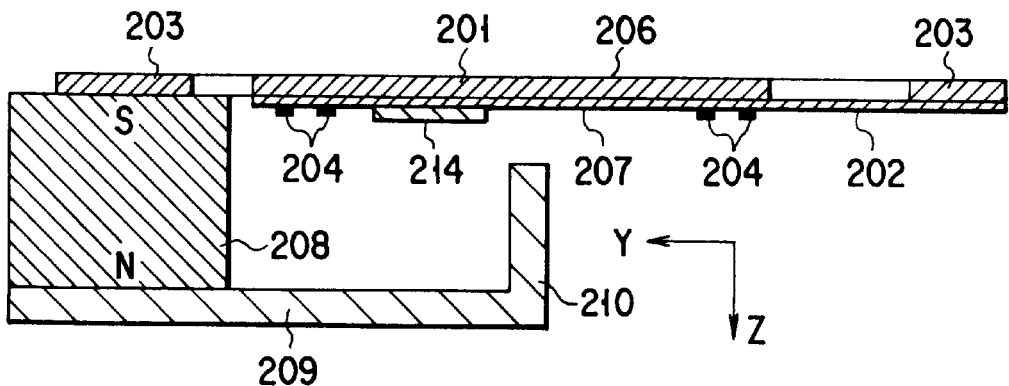
FIG. 23 is a cross section showing an optical deflector according to an eighth embodiment of the present invention.

FIG. 23 shows a cross section of the eighth embodiment, which is similar to FIG. 14. Its closed magnetic circuit will be described. At the outside of the driving coil 204, the permanent magnet 208 magnetized in the Z direction is bonded onto the supporter 203 at the side opposite to the elastic member 202. Next, to reduce the leakage of the magnetic field generated from the permanent magnet 208, the magnetic pole of the permanent magnet 208 at the side opposite to the supporter 203 connected to the permanent magnet 208 is connected to the magnetic yoke 209. In this closed magnetic circuit, a magnetic gap is formed between the permanent magnet 208 and the magnetic member 214. The driving coil 204 is positioned inside this magnetic gap. In the same manner as in the fourth embodiment, formation of the magnetic member makes it possible to reduce the leakage magnetic field between the permanent magnet 208 and the magnetic member 214 and make the magnetic-flux density in the driving coil 204 longer. Furthermore, the center of gravity of the movable plate 201 in the Z direction becomes near to the elastic member 202, and consequently the generation of an unnecessary mode vibration of the movable plate 201 can be suppressed.

Of course, the closed magnetic circuit in the eighth embodiment may be a structure wherein an additional permanent magnet is arranged at the side opposite to the side wherein the aforementioned permanent magnet is arranged, with the driving coil being centered in the Y direction, and further an additional magnetic yoke is arranged on the additional permanent magnet, or a structure having only the additional permanent magnet, in the same manner as in the sixth embodiment.

In the fifth, sixth, seventh and eighth embodiments, the fixing of the permanent magnet to the supporter is carried out by adhesion, but is not especially limited. For example, the fixing may be carried out by means of screws.

The following will describe a ninth embodiment.

Figure 24:
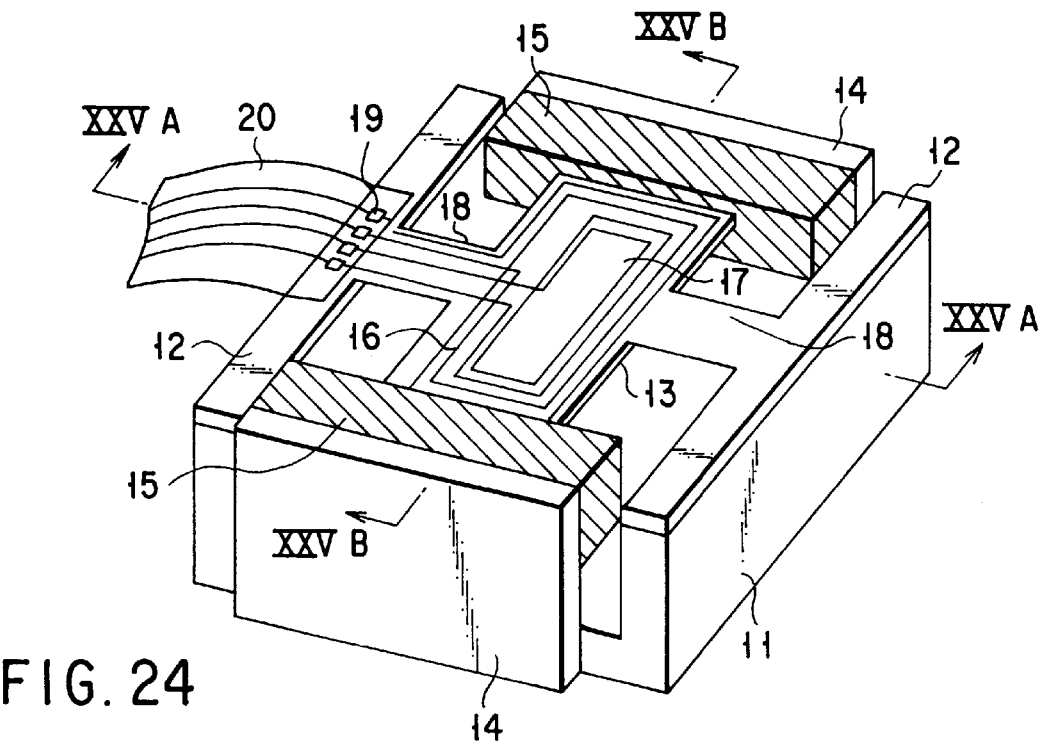
FIG. 24 is a perspective view showing a schematic structure of an optical deflector according to a ninth embodiment.
Figure 25A:
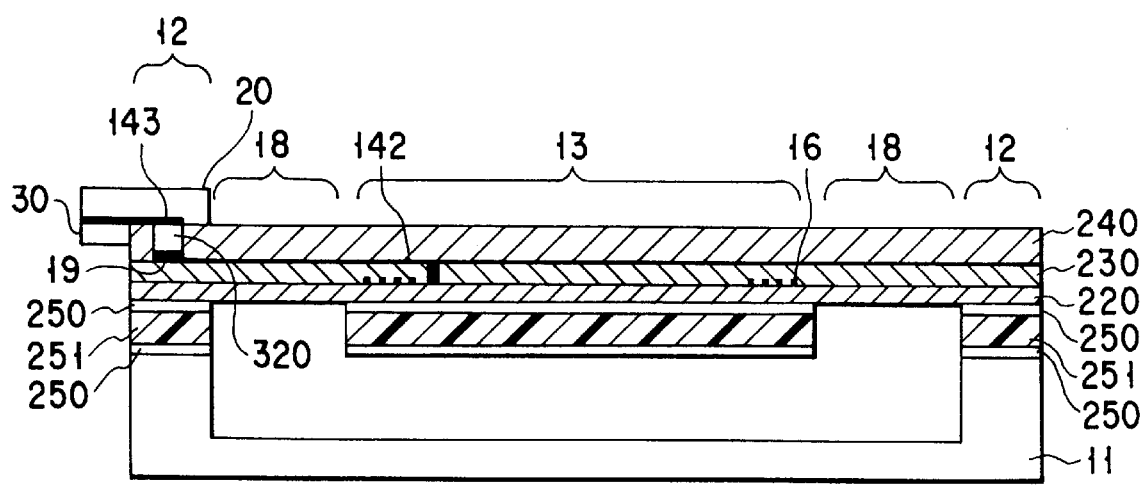
FIG. 25A is a across section along the XXVA—XXVA line, which is a central line of the optical deflector shown in FIG. 24.
Figure 25B:
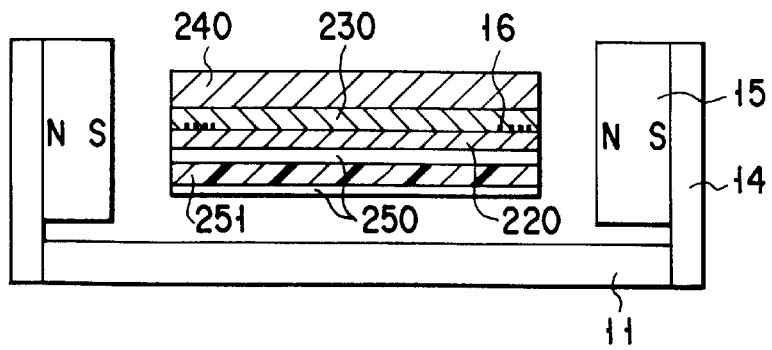
FIG. 25B is a cross section along the XXVB—XXVB line in FIG. 24.
Figure 27:
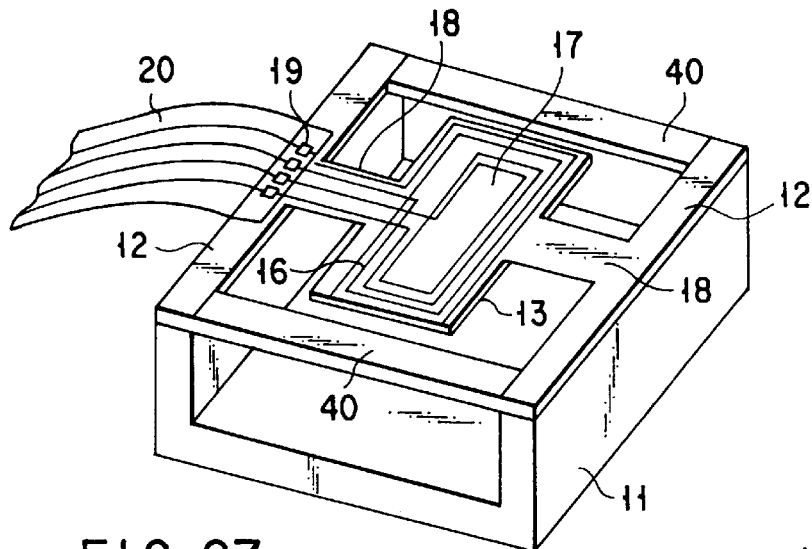
FIG. 27 is a view showing a mounting step.
Figure 28:
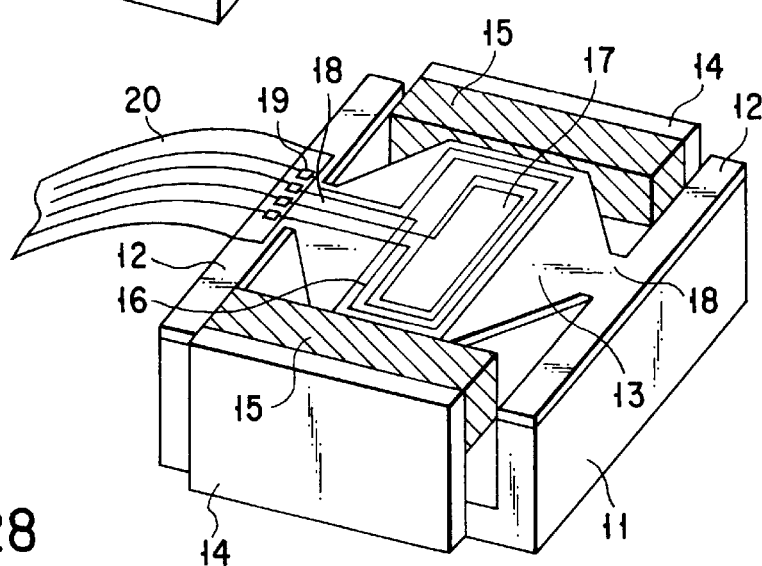
FIG. 28 is a perspective view showing a schematic structure of an optical deflector according to a tenth embodiment.

FIG. 24 is a perspective view of the schematic structure of an optical deflector according to the ninth embodiment. FIG. 25A is a cross section along the XXVA—XXVA line, which is a center line of the optical deflector shown in FIG. 24. FIG. 25B is a cross section along the XXVB—XXVB line in FIG. 24. FIGS. 26A to 26I are views showing steps of manufacturing the optical deflector according to the ninth embodiment. FIG. 27 is a view for explaining a mounting step, and FIG. 28 is a view showing a variation of the ninth embodiment optical deflector.

As shown in FIG. 24, the ninth embodiment optical deflector has a movable plate 13 the free ends of which can be vibrated, and permanent magnets 15 which are arranged oppositely at the free ends of the movable plate 13. The movable plate 13 and supporters 12 which are fixed ends are connected to each other through elastic members 18 in a plate spring form. A mirror face 17, as a mirror, is located on the surface of the movable plate 13. The movable plate 13 is equipped with a driving coil 16 going around near its peripheral end. A wiring is formed from the end of the driving coil 16 positioned at the inner periphery of the driving coil 16, so as to stride over the driving coil 16, and further the wiring is connected to electrode pads 19 through a wiring disposed on the elastic members 18. On the other hand, the end of the driving coil 16 positioned at the outer periphery of the driving coil 16 is connected to the electrode pads 19 through a wiring disposed at the elastic members 18. On the basis of the process of manufacturing optical deflectors, wirings are formed simultaneously. Thus, steps are formed at the wirings in the connection portions of the wirings and the ends of the driving coil 16.

Herein, the magnetized direction of the permanent magnet 15 is substantially perpendicular to the vibration direction of the movable plate 13, and the substantial center of the magnetized face is arranged at the position opposite to the plane face of the driving coil 16.

Referring to FIGS. 25A and 25B, the following will describe a sectional structure of the optical deflector shown in FIG. 24, along the line XXVA—XXVA line and the line XXVB—XXVB line.

As shown in FIG. 25A, which shows the cross section along the XXVA—XXVA line of the optical deflector shown in FIG. 24, a substrate 12 is composed of a silicon substrate 251, a silicon nitride film 250, a first polyimide layer 220, a second polyimide layer 230, and a third polyimide layer 240, which are laminated. In one of the supporters 12, the electrode pads 19 having a larger thickness than the wirings 142 striding over the driving coil 16 are disposed on the second polyimide layer 230. Penetrating holes are made in the portions of the electrode pads 19 of the third polyimide layer 240.

The movable plate 13 has a structure of the supporters 12 and a structure wherein the driving coil 16 is disposed on the first polyimide layer 220. The elastic members 18 are composed of the first polyimide layer 220, the second polyimide layer 230 and the third polyimide layer which are laminated. In one of the electric members 18, the wirings 142 are disposed on the second polyimide layer 230. The used silicon substrate 251 is a silicon monocrystal having a crystal face direction of (1 0 0). Polyimide is an elastic organic insulating material, and its elastic coefficient is far smaller than that of the silicon monocrystal substrate. Thus, the first polyimide layer 220, the second polyimide layer 230 and the third polyimide layer 240 become elastic thin layers which can be elastically deformed.

The thickness of the third polyimide layer 240 is made substantially equal to the total of the thicknesses of the first polyimide layer 220 and the second polyimide layer 230. Therefore, the driving coil 16 disposed on the second polyimide layer 230 is arranged at the position where the thickness of the elastic members 18 is substantially divided into two equal parts.

Furthermore, to connect one of the supporters 12 to an driving circuit, a wiring 143 on a flexible substrate 20 which is covered with a coverage film 30 and the electrode pads 19 on the supporters 12 are connected to each other through an anisotropic conductive adhesive agent 320.

As understood from FIG. 25B, which is a section along the XXVB—XXVB line of the optical deflector shown in FIG. 24, the permanent magnets 15 are fixed onto the walls of the magnetic yokes 14 so as to have the same clearance from the right and the left sides of the laminated structure of the movable plate 13 shown in FIG. 25A.

The following will describe the operation of the optical deflector having such a structure.

An alternating current is applied to the driving coil 16 through the electrode pads 19 from a non-illustrated power source. The driving coil 16 receives a force, in particular near the free ends of the movable plate 13 by the interaction of the current passing through the driving coil 16 and the magnetic field generated from the permanent magnets 15 arranged near the free ends of the movable plate 13. That is, the permanent magnets 15 and a part of the driving coil 16 function as an actuator. Since the current passing through the driving coil 16 is an alternating current, the direction of the force which the plane driving coil 16 receives changes periodically. In the laminated body of the first polyimide layer 220, the second polyimide layer 230, the third polyimide layer 240, portions which are not fixed to the silicon substrate 251 have a relatively low rigidity. These portions function as elastic members 18 in a plate spring form, and the movable plate 13 vibrates in the direction of its thickness. Its resonance frequency is decided as a single value dependently on the shape and the material of the movable plate 13 and the elastic members 18. By supplying an alternating current which has the frequency equal to this resonance frequency to the driving coil 16, the movable plate 13 vibrates with the maximum amplitude at the current value. A ray reflected on the mirror face 17 of the movable plate 13 is scanned to be reciprocated at a deflection angle specified by the movable plate 13.

Referring to FIGS. 26A to 26I, the method for manufacturing the optical deflector according to the present embodiment will be described hereinafter.

As shown in FIG. 26A, the silicon substrate 251 having a crystal face direction (1 0 0) is washed, and then the silicon nitride films 250 are deposited on the surfaces of the substrate 251 by a low pressure CVD system. The lower silicon nitride film 250 is dry-etched and partially removed so that a patterning is carried out. The patterned silicon nitride 250 works as a mask at the time of forming the supporters 12 and the movable plate 13 from the silicon substrate 251. The upper silicon nitride film 250 has a function of protecting the structure made on the upper silicon nitride 250 from the etching process of the silicon substrate at the time of forming the supporters 12 and the movable plate 13 from the silicon substrate 251.

As shown in FIG. 26B, the first polyimide layer 220 is formed on the upper silicon nitride layer 250. The first polyimide layer 220 is made into a film by applying a liquid polyimide solution uniformly onto the silicon substrate 251 by a printing or spin coating method, and drying/hardening the resultant film.

As shown FIG. 26C, the driving coil 16 is formed on the first polyimide layer 220. The driving coil 16 is produced by depositing aluminum by sputtering, and etching the aluminum to be patterned.

As shown in FIG. 26D, the second polyimide layer 230 for covering the driving coil 16 is deposited on the first polyimide layer 220. In the same manner as for the first polyimide layer, the second polyimide layer 230 is made into a film by applying a liquid polyimide solution uniformly onto the first polyimide layer 220 and drying/hardening the resultant film.

As shown in FIG. 26E, the wirings 142 are formed on the second polyimide layer 230. The wirings 142 are formed by etching sputtered aluminum to be patterned. In this step, the wiring 142 is formed so as to stride over the plane driving coil 16 made in the step shown in FIG. 26C. For this reason, the upper polyimide at the inner periphery of the driving coil 16 is first removed by etching, and then aluminum is deposited onto the removed area. The aluminum is patterned to connect the layers electrically, and then aluminum is deposited onto the second polyimide layer 230 and is patterned.

As shown in FIG. 26F, the third polyimide layer 240 is deposited on the second polyimide layer 230. In the same manner as for the first and second polyimide layers, the third polyimide layer 240 is made into a film by applying a liquid polyimide solution uniformly onto the second polyimide layer 230 and drying/hardening the resultant film. The third polyimide layer 240 is formed so as to cause the elastic members 18 to have predetermined characteristics, and additionally has functions of preventing the wirings 142 from being exposed to the air and changing over the passage of time, and protecting insulation. The thickness of the third polyimide layer 240 is made substantially equal to the sum of the thicknesses of the first and second polyimide layers 220 and 230. When the optical deflector is finished, the wirings 142 present inside the elastic members are arranged at the position where the thickness of the elastic members is substantially divided into two equal parts.

Furthermore, chromium and aluminum are deposited on a portion corresponding to the mirror face of the third polyimide layer 240 by vapor deposition in an electron shower manner through a mask, so as to form the mirror face.

As shown in FIG. 26G, the portions of the third polyimide layer 240 on the electrode pads 19 are removed by dry etching.

As shown in FIG. 26H, in order to form the elastic members, the patterned silicon nitride film 250 beneath the silicon substrate 251 is used as a mask to anisotropically etch and remove the silicon substrate 251, from its lower face, with an alkaline solution. At this time, the silicon nitride 250 beneath the first polyimide layer 220 works as a mask for protecting the first polyimide layer 220 when the silicon substrate 251 is etched and then penetrated.

As shown in FIG. 26I, the silicon nitride film 250 which has functioned as a mask layer for the first polyimide layer 220 is removed by dry etching after the silicon substrate 251 is etched. Thereafter, the polyimide layer at other portions than positions where the elastic members are formed is removed, from its back face by oxygen-based dry etching, so as to complete a monolithic structure.

If necessary, instead of forming the mirror face in the step shown in FIG. 26F, the mirror face may be formed on the back face of the silicon substrate in the same step. In the case in which a high reflectivity is unnecessary, the back face of the silicon substrate may be used by itself as the mirror face.

In the structure thus manufactured, a wiring circuit to the driving circuit is formed through an anisotropic conductive adhesive agent, and then its surface is thermo-compression bonded to a flexible substrate the surface of which is subjected to insulation-protection by a coverage film. Subsequently, the structure is fixed to the fixing member 11, as shown in FIG. 27. Thereafter, connecting members 40 are removed by mechanical destruction, and further magnetic yokes to which permanent magnets are attached are fitted to the fixing member 11, to obtain the optical deflector of the present embodiment as shown in FIG. 24. To destroy the connecting members 40 easily, it is preferred to introduce scribe lines beforehand into the silicon substrate by an etching process or the like.

In the step shown in FIG. 26A, the nitride film at the portions where the scribe lines are formed is removed into a line form of, for example, 100 μm width, and at the time of the silicon etching shown in FIG. 26H, etching of the nitride film is simultaneously carried out to form scribe lines in the form of a V groove.

According to the aforementioned optical deflector of the present embodiment, a larger diameter of a luminous flux can be obtained by an electromagnetic driving manner. By making the driving coil into a movable member, the movable member can be made light, and a high-speed scanning is stably performed. Moreover, by making the driving coil nearer to the permanent magnets, it is possible to provide an optical deflector which is small-sized and highly efficient and stable in its characteristics, and can reduce electric power consumption.

Even in such conventional manufacturing methods that respective components are separately made from respective raw materials and then the components are assembled, it is possible to make optical deflectors to some extent small-sized and light if a mechanism is added which can adjust characteristics of the elastic members holding the movable plate. The supporter, the elastic members and the movable plate can be formed in sequence steps to be integrated with each other by a manufacture method using such a fine processing technique based on micromachining as in the present embodiment. Therefore, it is possible to reduce subsequent assembling steps and mass-produce very small optical deflectors having a small number of parts at low costs. Furthermore, a semiconductor manufacturing technique which is good at thin layer lamination is used; therefore it is possible to produce smaller and lighter optical deflectors which have a high size-accuracy and a very little scattering in their characteristics and do not require any adjusting mechanism. Brittle fracture is not liable to arise and a large deflection angle can also be obtained by using polyimide which is an organic insulating material as elastic members. Additionally, the driving coil and the wirings are not exposed to the surface of polyimide and are formed inside, and thus a change in characteristics by humidity and oxidization can be suppressed. Furthermore, a stable driving with a little position shift can be realized by using a manner of twisting a beam both whose ends are held.

The aforementioned structure comprising the mirror face and the driving coil is fixed to the fixing member, and then the connecting members are removed and further the magnetic yokes to which the permanent magnets are attached are fitted to the fixing member. This makes it possible to maintain a good handling property, not change the characteristics and make the efficiency higher based on the approach to the permanent magnets.

The respective components of the present embodiment are not limited to the above, and may be many types of variations and alternations. For example, the plane driving coil is formed by a plating process, instead of a film deposition based on sputtering, and etching process. In this case, wirings or the like can easily be made thick, and therefore a large deflection angle can be obtained by decreasing the resistance of the driving coil and increasing the number of the winding thereof.

The respective polyimide layers are made of materials which can exhibit various characteristics in accordance with physical properties, such as rigidity and expansion coefficients, or types of application to the respective layers, such as a solvent soluble type, light reactive type, additive type or thermoplastic type. For this reason, it is unnecessary that the same material is used. A combination of various materials may be used. Patterning of polyimide may be a manner of using laser ablation or the like. In the present embodiment, the mirror face is formed on the third polyimide layer, but the mirror face may be formed by etching and removing the polyimide layer at the center and the entire nitride film to expose the surface of the silicon substrate, and then deposing aluminum thereon through sputtering.

In the present embodiment, the mirror face is formed on the movable plate, but the mirror face may be formed on the lower surface of the movable plate by depositing a metallic film such as a gold film in the case wherein the mirror face having a large area is necessary. The connection of the wirings of the flexible substrate to the electrode pads on the substrate may in the form of wire bonding and subsequent resin sealing. The driving method is not limited to the aforementioned method of using an alternating current equal to the resonance frequency. For example, static positioning can be carried out by the driving based on variable frequency or a direct current.

The following will describe a tenth embodiment of the present invention.

FIG. 28 is a view showing the structure of the tenth embodiment of the present invention. In the ninth embodiment, the shape of the movable member 13 is a rectangle which is symmetrical with respect to the vibration axis of the movable member 13. As shown in FIG. 28, in the tenth embodiment the shape of the movable member 13 is a hexagon having sides which extend from cross portions at which respective elastic members 18 are branched from supporters 12 to free ends of the movable member 13 and which are symmetrical with respect to the vibration axis of the movable member 13. Concerning the size of the elastic members 18, the cross portion at which the elastic members 18 are branched from the supporter 12 should have a length one tenth as long as the whole length of the movable member 13. Other structure than the above is the same as that of the ninth embodiment.

Since the elastic members 18 in the tenth embodiment support the whole weight of the movable member 13, preferably the thickness of the members 18 are somewhat thicker than the thickness used in the ninth embodiment, or the members 18 having a high rigidity are used. Since the elastic members in the present embodiment are made as short as possible, it is possible to avoid a phenomenon that the elastic members 18 are bent by the weight of the movable member 13 so that the free end positions of the movable member 13 are not stabilized.

The specific embodiments mentioned above include the invention having the following structures.

(1) An optical deflector, comprising:
  a supporter,
  a movable plate on which a mirror face for reflecting light is formed,
  at least one elastic member for connecting the movable plate and the supporter and holding the movable plate so that the movable plate can deflect,
  a driving coil which is formed in a ring form on the movable plate in such a manner that the driving coil passes near a movable end of the movable plate when the movable plate deflection-moves, and
  a magnet and a magnetic yoke generating a closed magnetic circuit for applying a magnetic field to the driving coil in the direction substantially parallel to the plane of the movable plate;
  wherein the optical deflector generates a driving force by applying a current to the driving coil inside a magnetic gap of the closed magnetic circuit and deflection-moving the movable plate by elastic deformation of the at least one elastic member, and
  the magnet is arranged at a position opposite to the movable end of the movable plate outside the driving coil, and the magnet or the magnetic yoke generating the closed magnetic circuit is arranged at a position near the movable plate inside the driving coil to form the magnetic gap.

In the optical deflector of the structure (1), no holes are made in the movable plate. Thus, the rigidity of the movable plate rises. This makes it possible that an unnecessary resonance is not generated, to obtain a smooth vibration even if the optical deflector is driven by a high frequency. The moment of inertia of the movable plate decreases so that a large deflection angle can be obtained by a high frequency driving, and further the magnetic-flux density in the driving coil becomes large by the closed magnetic circuit. Therefore, the present optical deflector becomes a member which can give a large deflection angle at less electric power consumption than conventional optical deflectors. Moreover, the magnet or the yoke arranged inside the driving coil and near the movable plate also functions as a stopper when the vibration of the movable plate becomes more than required.

The embodiments corresponding to this invention are the first, second, fifth and sixth embodiments.

(2) An optical deflector, comprising:
  a supporter,
  a movable plate on which a mirror face for reflecting light is formed,
  an elastic member for connecting the movable plate and the supporter and holding the movable plate so that the movable plate can deflect,
  a driving coil which is formed in a ring form on the movable plate in such a manner that the driving coil passes near a movable end of the movable plate when the movable plate deflection-moves, and
  a magnet and a magnetic yoke generating a closed magnetic circuit for applying a magnetic field to the driving coil in the direction substantially parallel to the plane of the movable plate;
  wherein the optical deflector generates a driving force by applying a current to the driving coil inside a magnetic gap of the closed magnetic circuit and deflection-moving the movable plate by elastic deformation of the elastic member,
  a magnetic member generating the closed magnetic circuit is further disposed on the movable plate, and
  the magnet or the magnetic yoke generating the closed magnetic circuit is arranged at a position opposite to the magnetic member to form the magnetic gap.

In the optical deflector of the structure (2), no holes are made in the movable plate. Thus, the rigidity of the movable plate rises. This makes it possible that an unnecessary resonance is not generated, to obtain a smooth vibration even if the optical deflector is driven by a high frequency. The moment of inertia of the movable plate decreases so that a large deflection angle can be obtained by a high frequency driving, and further the magnetic-flux density in the driving coil becomes large by the closed magnetic circuit. Therefore, the present optical deflector becomes a member which can give a large deflection angle at less electric power consumption than conventional optical deflectors. Moreover, by the presence of the closed magnetic circuit on the movable plate, the gravity center of the movable plate approaches the elastic member. Thus, a smooth vibration of the movable plate can be obtained.

The embodiments corresponding to this invention are the third, fourth, seventh and eighth embodiments. (3) The optical deflector according to the structure (2), wherein magnet is arranged at a position opposite to the movable end of the movable plate outside the driving coil, and the magnet or the magnetic yoke generating the closed magnetic circuit is arranged at a position near the movable plate inside the driving coil.

According to the optical deflector of the structure (3), the same effects and advantages as by the optical deflector of the structure (2) can be obtained and further the magnet or the yoke arranged inside the driving coil and near the movable plate also functions as a stopper when the vibration of the movable plate becomes more than required.

The embodiments corresponding to this invention are the fourth and eighth embodiments.

(4) The optical deflector according to the structure (2), wherein the magnet is arranged at a position opposite to the movable end of the movable plate outside the driving coil.

According to the optical deflector of the structure (4), the same effects and advantages as by the optical deflector of the structure (2) can be obtained.

The embodiments corresponding to this invention are the third and seventh embodiment.

(5) The optical deflector according to any one of the structures (1) to (4), wherein the supporter, the elastic member, the movable plate and the driving coil are monolithically formed in a body.

The optical deflector of the structure (5) further becomes smaller and has fewer manufacturing steps than the prior art.

The embodiments corresponding to this invention are the first, second, third, fourth, fifth, sixth, seventh and eighth embodiments.

(6) The optical deflector according to any one of the structures (1) to (5), wherein the magnet is arranged at the position where the driving moment of the movable plate becomes maximum.

According to the optical deflector of the structure (6), further a large deflection angle can be obtained at less electric power consumption than the prior art.

The embodiments corresponding to this invention are the first, second, third, fourth, fifth, sixth, seventh and eight embodiments.

(7) The optical deflector according to the structure (2), wherein the magnetic member disposed on the movable plate is monolithically formed to the movable plate.

The optical deflector of the structure (7) further becomes smaller and has fewer manufacturing steps than the prior art.

The embodiments corresponding to this invention are the third, fourth, seventh and eighth embodiments.

(8) The optical deflector according to any one of the structures (1) to (7), which is made so that the direction along which the elastic member supports the movable plate crosses the direction along which the magnetic field is applied by the closed magnetic circuit in such a manner that the elastic member is torsionally vibrated by swinging-movement of the movable plate.

The optical deflector of the structure (8) further becomes an optical deflector which can give torsional vibration.

The embodiments corresponding to this invention are the first, third, fifth and seventh embodiments.

(9) The optical deflector according to any one of the structures (1) to (7), which is made so that the direction along which the elastic member supports the movable plate becomes substantially the same as the direction along which the magnetic field is applied by the closed magnetic circuit in such a manner that the elastic member is bending-vibrated by deflecting-movement of the movable plate.

The optical deflector of the structure (9) further becomes an optical deflector which can give bending vibration.

The embodiments corresponding to this invention are the second, fourth, sixth and eighth embodiments.

(10) An optical deflector, comprising:
 a fixing member,
 supporters which are arranged separately from each other and fixed to the fixing member,
 a movable plate having a mirror face for reflecting light,
 elastic members for connecting the movable plate and the supported, and
 an actuator for deforming the elastic members elastically to cause a relative displacement of the movable plate from the supporters;
 at least the movable plate, the supporters and the elastic members being monolithically formed as a unitary one-piece structure and a part of the actuator is arranged at a position between the supporters.

In the optical deflector of the structure (10), at least the movable plate, the supporters and the elastic members are monolithically formed as the unitary one-piece structure, and at least two elastic members are formed, and further the supporters connected to the respective elastic members are separated from each other. Therefore, it is possible to provide a small-sized, highly efficient optical deflector wherein more approach of the actuator can be realized, its driving force can be enlarged more, its electric power consumption is small, and its characteristics are stable.

The embodiments corresponding to this invention are the first, third, fifth, seventh, ninth and tenth embodiments.

(11) The optical deflector according to the structure (10), wherein the elastic members are formed into a beam both ends of which are held.

In the optical deflector of the structure (12), the elastic members are formed into a beam both ends of which are held. As a result, the optical deflector (12) becomes more stable in its mirror angle and position than the single end held structure. Therefore, is possible to provide a highly efficient optical deflector wherein a large displacement can be obtained by a stable driving force and electric power consumption is small.

The embodiments corresponding to this invention are the first, third, fifth, seventh, ninth and tenth embodiments.

(12) The optical deflector according to the structures (10) or (11), wherein a part of the actuator is fixed to the fixing member, and the actuator is arranged at a position where the part of the actuator is adjacent to the movable plate, so as to include a part of a plane obtained by extending the movable plate.

In the optical deflector of the structure (12), a part of the actuator is fixed to the fixing member, and the actuator is arranged at a position where the part of the actuator is adjacent to the movable plate, so as to include a part of a face obtained by extending the movable plate. As a result, it is possible to provide an optical deflector wherein a larger driving space can be ensured and a large displacement can be obtained.

The embodiments corresponding to this invention are the first, third, fifth, seventh, ninth and tenth embodiments.

(13) The optical deflector according to any one of the structures (10) to (12), wherein the actuator fixed to the fixing member is a permanent magnet and the actuator fixed to the movable plate is a coil.

In the optical deflector of the structure (13), the actuator fixed to the fixing member is a permanent magnet and the actuator fixed to the movable plate is a coil. As a result, a large luminous flux can be obtained in an electromagnetic driving manner. The coil constitutes a movable member, and consequently it is possible to provide a highly efficient optical deflector wherein its movable member is light so as to realize a high-speed scanning and stable acquirement of a large displacement, and further electric power consumption is small.

The embodiments corresponding to this invention are the first, third, fifth, seventh, ninth and tenth embodiments.

(14) A method for manufacturing an optical deflector comprising:
 a fixing member,
 supporters which are arranged separately from each other and fixed to the fixing member,
 a movable plate having a mirror face for reflecting light,
 elastic members for connecting the movable plate and the supporters,
 an actuator for deforming the elastic members elastically to cause a relative displacement of the movable plate from the supporters, and
 connecting members for connecting the supporters in such a manner that the connecting members can be removed after the supporters are fixed to the fixing member,
 by monolithically forming at least the movable plate, the supporters, the elastic members, and the connecting members as a unitary one-piece structure,
 fixing the monolithically formed resultant unit to the fixing member and then removing the connecting members, and
 fixing a part of the actuator onto the fixing member at a position where the connecting members are removed.

In the optical deflector of the structure (15), at least two elastic members are connected to the movable plate, and the supporters connected to the respective elastic members are separated from each other. In addition, at least the supporters, the movable plate, and the elastic members are formed into an integrated unit by using a semiconductor manufacturing process. Therefore, it is possible to perform the assembling work without giving any load to the weak movable plate and elastic members, and fix the aforementioned unit easily to the fixing member.

The embodiments corresponding to this invention are the first, third, fifth, seventh, ninth and tenth embodiments.

As described above, according to the present invention, it can be made unnecessary to make holes in the movable member, and thus the rigidity of the movable member is improved. For this reason, it is possible to provide an optical deflector which does not generate an unnecessary resonance even when driven by a high frequency. Also, the optical deflector can give a large deflection angle at less electric power consumption by making the driving force of the movable member larger by means of the closed magnetic circuit wherein the magnetic-flux density in its driving coil is made stronger.

Additionally, according to the present invention, at least two elastic members are connected to the movable plate, and the supporters connected to the respective elastic members are separated from each other. In addition, at least the supporters, the movable plate, and the elastic members are monolithically formed in a body. Accordingly, it is possible to provide a small-sized and highly efficient optical deflector wherein its electric power consumption is small and its characteristic is stable.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An optical deflector, comprising:

a supporter, a movable plate on which a mirror face for reflecting light is formed, at least one elastic member for connecting the movable plate and the supporter and holding the movable plate so that the movable plate can deflect, a driving coil which is formed in a ring form on the movable plate in such a manner that the driving coil passes near a movable end of the movable plate when the movable plate deflection-moves, and a magnet and a magnetic yoke generating a closed magnetic circuit for applying a magnetic field to the driving coil in a direction substantially parallel to the plane of the movable plate;

wherein the optical deflector generates a driving force by applying a current to the driving coil inside a magnetic gap of the closed magnetic circuit and deflection-moving the movable plate by elastic deformation of the at least one elastic member, and wherein the magnet is arranged at a position opposite to the movable end of the movable plate outside the driving coil, and at least one of the magnet and the magnetic yoke is arranged at a position near the movable plate inside the driving coil to form the magnetic gap.

2. An optical deflector, comprising:

a supporter, a movable plate on which a mirror face for reflecting light is formed, at least one elastic member for connecting the movable plate and the supporter and holding the movable plate so that the movable plate can deflect, a driving coil which is formed in a ring form on the movable plate in such a manner that the driving coil passes near a movable end of the movable plate when the movable plate deflection-moves, and a magnet and a magnetic yoke generating a closed magnetic circuit for applying a magnetic field to the driving coil in a direction substantially parallel to the plane of the movable plate;

wherein the optical deflector generates a driving force by applying a current to the driving coil inside a magnetic gap of the closed magnetic circuit and deflection-moving the movable plate by elastic deformation of the at least one elastic member, wherein a magnetic member further generating the closed magnetic circuit is disposed on the movable plate, and wherein one of the magnet and the magnetic yoke is arranged at a position opposite to the magnetic member to form the magnetic gap.

3. The optical deflector according to claim 2, wherein the magnet is arranged at a position opposite to the movable end of the movable plate outside the driving coil, and at least one of the magnet and the magnetic yoke is arranged at a position near the movable plate inside the driving coil.

4. The optical deflector according to claim 2, wherein the magnet is arranged at a position opposite to the movable end of the movable plate outside the driving coil.

5. The optical deflector according to claim 1, wherein the supporter, the at least one elastic member, the movable plate and the driving coil are monolithically formed in a body.

6. The optical deflector according to claim 1, wherein the magnet is arranged at a position where a driving moment of the movable plate becomes maximum.

7. The optical deflector according to claim 2, wherein the magnetic member disposed on the movable plate is monolithically formed with the movable plate.

8. The optical deflector according to claim 1, wherein a direction along which the at least one elastic member supports the movable plate crosses a direction along which the magnetic field is applied by the closed magnetic circuit in such a manner that the at least one elastic member is torsionally vibrated by swinging-movement of the movable plate.

9. The optical deflector according to claim 1, wherein a direction along which the at least one elastic member supports the movable plate becomes substantially identical to a direction along which the magnetic field is applied by the closed magnetic circuit in such a manner that the at least one elastic member is bending-vibrated by deflecting-movement of the movable plate.

10. An optical deflector, comprising:

a fixing member, supporters which are arranged separately from each other and fixed to the fixing member, a movable plate having a mirror face for reflecting light, elastic members for connecting the movable plate and the supporters, and an actuator for deforming the elastic members elastically to cause a relative displacement of the movable plate from the supporters;

wherein at least the movable plate, the supporters and the elastic members are monolithically formed as a unitary one-piece structure, and a part of the actuator is arranged at a position between the supporters.

11. The optical deflector according to claim 10, wherein the elastic members are formed into a beam both ends of which are held.

12. The optical deflector according to claim 10, wherein the part of the actuator is fixed to the fixing member, and the actuator is arranged at a position where the part of the actuator is adjacent to the movable plate, so as to include a part of a plane obtained by extending the movable plate.

13. The optical deflector according to claim 10, wherein the actuator comprises a permanent magnet fixed to the fixing member and a coil fixed to the movable plate.

14. The optical deflector according to claim 13, wherein the permanent magnet is fixed to a supporting member different from the fixing member, and the supporters and the supporting member are fixed to each other through the fixing member.

15. A method for manufacturing an optical deflector comprising:

a fixing member, supporters which are arranged separately from each other and fixed to the fixing member, a movable plate having a mirror face for reflecting light, elastic members for connecting the movable plate and the supporters, an actuator for deforming the elastic members elastically to cause a relative displacement of the movable plate from the supporters, and connecting members for connecting the supporters in such a manner that the connecting members can be removed after the supporters are fixed to the fixing member, by monolithically forming at least the movable plate, the supporters, the elastic members, and the connecting members in a body to form a unitary one-piece structure, by fixing the monolithically formed unitary one-piece structure to the fixing member and then removing the connecting members, and by fixing a part of the actuator onto the fixing member at a position at which the connecting members have been removed.

* * * * *